US012018592B1

(12) United States Patent
Ramakrishnan et al.

(10) Patent No.: US 12,018,592 B1
(45) Date of Patent: Jun. 25, 2024

(54) OUTLET GUIDE VANE ASSEMBLY FOR A TURBOFAN ENGINE

(71) Applicant: General Electric Company, Schenectady, NY (US)

(72) Inventors: Kishore Ramakrishnan, Rexford, NY (US); Ravish Karve, Bengaluru (IN); Sara Elizabeth Carle, Hilliard, OH (US); Trevor Howard Wood, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/086,112

(22) Filed: Dec. 21, 2022

(51) Int. Cl.
*F01D 9/04* (2006.01)
*F01D 25/28* (2006.01)

(52) U.S. Cl.
CPC ............. *F01D 9/041* (2013.01); *F01D 25/28* (2013.01); *F05D 2220/323* (2013.01); *F05D 2250/37* (2013.01); *F05D 2260/961* (2013.01)

(58) Field of Classification Search
CPC ... F05D 2250/37; F05D 2260/961; F02K 5/00
See application file for complete search history.

(56) References Cited

U.S. PATENT DOCUMENTS 2,920,864 A 1/1960 Lee
8,177,513 B2 5/2012 Shim et al.
8,678,752 B2 * 3/2014 Delvaux .................. F01D 5/16 415/119
9,303,520 B2 4/2016 Hasting et al.
10,358,926 B2 7/2019 Tweedt
(Continued)

FOREIGN PATENT DOCUMENTS

CN 203614229 U 5/2014

OTHER PUBLICATIONS

Van Amhem, Unconventional Propeller-Airframe Integration for Transport Aircraft Configurations, Doctoral Thesis, 2022, 389 Pages https://repository.tudelft.nl/islandora/object/uuid%3A4d47b-db-1e6a-4f38-af95-aafd33c39402.

*Primary Examiner* — Courtney D Heinle
*Assistant Examiner* — Danielle M. Christensen
(74) *Attorney, Agent, or Firm* — Dority & Manning, P.A.

(57) ABSTRACT

A turbofan engine defining a circumferential direction is provided. The turbofan engine includes: a turbomachine, the turbomachine defining a pylon attachment location along the circumferential direction; an unducted rotor assembly drivingly coupled to the turbomachine, the unducted rotor assembly including a plurality of unducted rotor blades; and a plurality of outlet guide vanes positioned downstream of the plurality of unducted rotor blades, the plurality of outlet guide vanes including $N_{OGV}$ number of outlet guide vanes, the plurality of outlet guide vanes including a first outlet guide vane and a second outlet guide vane adjacent the first outlet guide vane, the first and second outlet guide vanes defining a gap spacing greater than 360 degrees divided by $N_{OGV}$, and the pylon attachment location positioned outside of between the first and second outlet guide vanes along the circumferential direction.

18 Claims, 13 Drawing Sheets

(56) References Cited

U.S. PATENT DOCUMENTS

| | | | |
|---|---|---|---|
| 10,556,699 | B2 | 2/2020 | Pautis et al. |
| 10,751,958 | B2 | 8/2020 | Kray et al. |
| 11,608,743 | B1 * | 3/2023 | Tweedt .................... F01D 5/141 |
| 2017/0268537 | A1 * | 9/2017 | Mielke .................. F04D 29/666 |
| 2021/0108523 | A1 | 4/2021 | Miller et al. |
| 2021/0222575 | A1 | 7/2021 | Breeze-Stringfellow et al. |

* cited by examiner

OUTLET GUIDE VANE ASSEMBLY FOR A TURBOFAN ENGINE

FIELD

The present disclosure relates to an outlet guide vane assembly for a turbofan engine and a turbofan engine including the same.

BACKGROUND

A gas turbine engine generally includes a turbomachine and a rotor assembly. Gas turbine engines, such as turbofan engines, may be used for aircraft propulsion. In the case of a turbofan engine, the rotor assembly may include a plurality of unducted rotor blades. During various operating conditions of the turbofan engine, it may be desirable to reduce a noise generated. Improvements to a turbofan engine to reduce noise generation would be useful in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
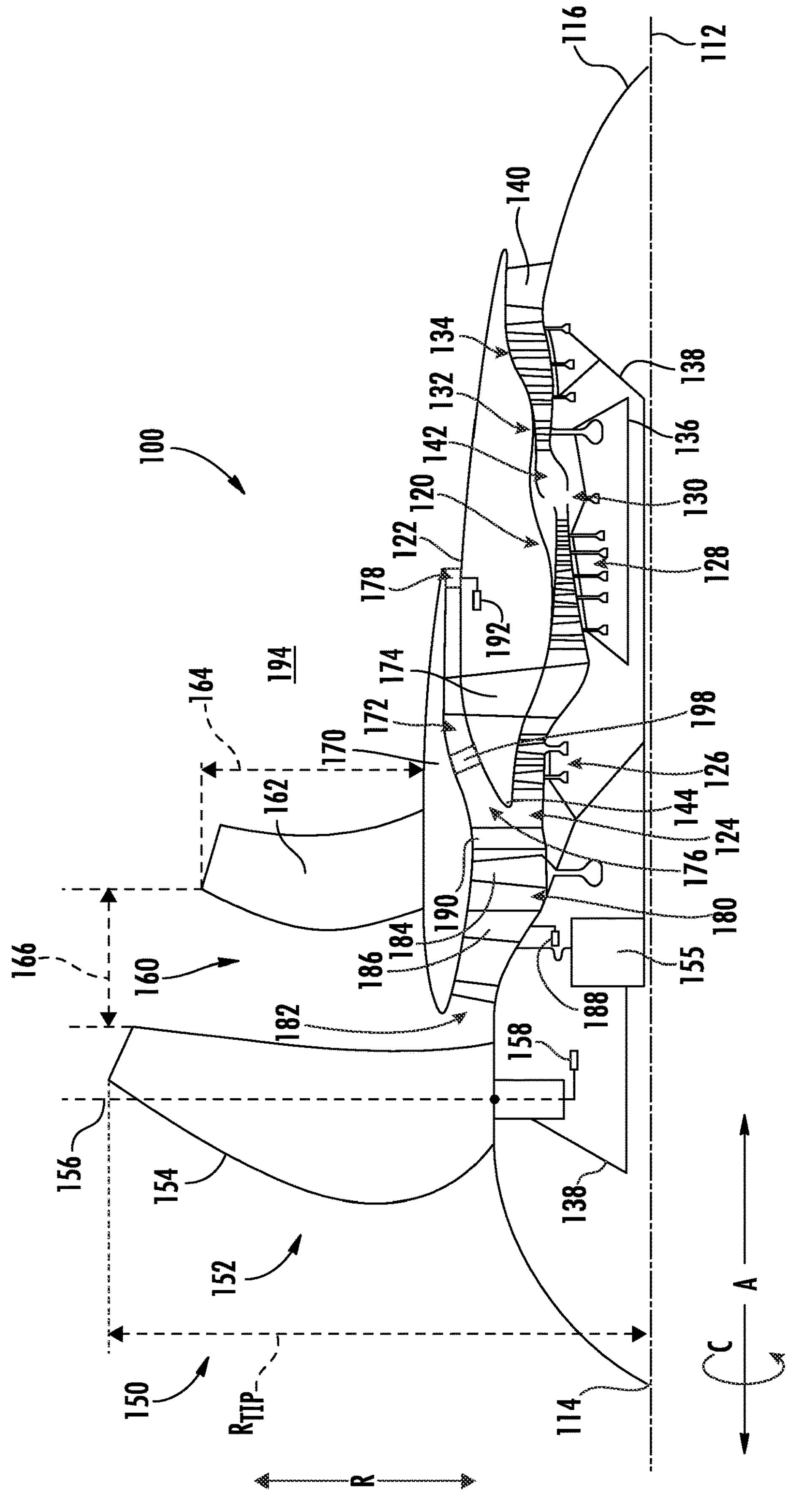
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

The singular forms “a”, “an”, and “the” include plural references unless the context clearly dictates otherwise.

The term “at least one of” in the context of, e.g., “at least one of A, B, and C” refers to only A, only B, only C, or any combination of A, B, and C.

The term “turbomachine” refers to a machine including one or more compressors, a heat generating section (e.g., a combustion section), and one or more turbines that together generate a torque output.

The term “gas turbine engine” refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term “combustion section” refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The term “propulsive efficiency” refers to an efficiency with which the energy contained in an engine’s fuel is converted into kinetic energy for the vehicle incorporating the engine, to accelerate it, or to replace losses due to aerodynamic drag or gravity.

The terms “coupled,” “fixed,” “attached to,” and the like refer to both direct coupling, fixing, or attaching, as well as indirect coupling, fixing, or attaching through one or more intermediate components or features, unless otherwise specified herein.

As used herein, the terms “first”, “second”, and “third” may be used interchangeably to distinguish one component from another and are not intended to signify location or importance of the individual components.

As used herein, the term “adjacent” when used to identify a component of a plurality of the same or similar components relative to a base component, refers to a component of the plurality of components positioned next to the base component with no intervening components of the plurality of components positioned therebetween. For example, when used to identify an outlet guide vane of a plurality of outlet guide vanes relative to a first outlet guide vane (e.g., “an outlet guide vane adjacent the first outlet guide vane”), adjacent refers to one of the outlet guide vanes positioned next to the first outlet guide vane with no intervening outlet guide vanes positioned therebetween.

The term “highest loaded rotor blade” with reference to a rotor assembly of a gas turbine engine, refers to the rotor blade that is subjected to the highest aerodynamic load of all the individual rotor blades during an operating condition of the gas turbine engine at a single instance. The “aerodynamic load” on the rotor blades refers to the total force on an individual rotor blade, e.g., as a result of a pressure change across the rotor blade. As will be appreciated from the description hereinbelow, during a climb operating mode (e.g., a high angle of attack mode), the highest loaded rotor blade may be located 90 degrees from top-dead-center in a direction of rotation of the rotor assembly. During other operating modes (e.g., cruise), the highest loaded rotor blade may be determined based on a position of a pylon fairing, a wing, etc.

A “third stream” as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

Referring now to FIG. 1, a schematic cross-sectional view of a gas turbine engine 100 is provided according to an example embodiment of the present disclosure. Particularly, FIG. 1 provides a turbofan engine having a rotor assembly with a single stage of unducted rotor blades. In such a manner, the rotor assembly may be referred to herein as an “unducted fan,” or the entire engine 100 may be referred to as an “unducted turbofan engine.” In addition, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure (“LP”) compressor 126 for pressurizing the air that enters the turbomachine 120 through core inlet 124. A high pressure (“HP”), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms “high/low speed” and “high/low pressure” are used with respect to the high pressure/high speed system and low pressure/low speed system interchangeably. Further, it will be appreciated that the terms “high” and “low” are used in this same context to distinguish the two systems, and are not meant to imply any absolute speed and/or pressure values.

The high energy combustion products flow from the combustor 130 downstream to a high pressure turbine 132. The high pressure turbine 128 drives the high pressure compressor 128 through a high pressure shaft 136. In this regard, the high pressure turbine 128 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor or open fan engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween, and more specifically defines a tip radius $R_T$IP from the longitudinal axis 112 to the tips of the fan blades 154 along the radial direction R. Each fan blade 154 defines a central blade axis 156. For this embodiment, each fan blade 154 of the fan 152 is rotatable about its central blade axis 156, e.g., in unison with one another. One or more actuators, also referred to herein as one or more pitch change mechanisms, 158 are provided to facilitate such rotation and therefore may be used to change a pitch of the fan blades 154 about their respective central blades' axes 156.

The fan section 150 further includes an outlet guide vane array 160 that includes outlet guide vanes 162 (only one shown in FIG. 1; sometimes also referred to as fan guide vanes) disposed around the longitudinal axis 112. For this embodiment, the outlet guide vanes 162 are not rotatable about the longitudinal axis 112. Each outlet guide vane 162 has a root and a tip and a span defined therebetween. The outlet guide vanes 162 may be unshrouded as shown in FIG. 1 or, alternatively, may be shrouded, e.g., by an annular shroud spaced outward from the tips of the outlet guide vanes 162 along the radial direction R or attached to the outlet guide vanes 162.

As will be appreciated, the outlet guide vanes 162 each define an outlet guide vane (OGV) span 164 along the radial direction R from a root to a tip. Additionally, the outlet guide vanes 162 are spaced from the fan blade 154 along the axial direction A by a distance or spacing 166. The spacing 166 is measured from an aft-most edge of the fan blade 154 to a forward-most edge of the outlet guide vanes 162 along the axial direction A.

In the embodiment depicted, as noted above, each outlet guide vane 162 is configured as a fixed guide vane, unable to be pitched about a central blade axis. The outlet guide vanes 162 are thus mounted to a fan cowl 170 in a fixed manner.

It will be appreciated, however, that in other embodiments, the outlet guide vanes 162 may alternatively be variable pitch outlet guide vanes 162.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the outlet guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vane 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 198 may be positioned in thermal communication with the fan duct 172. For example, one or more heat exchangers 198 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 198 may be an annular heat exchanger extending substantially 360 degrees in the fan duct 172 (e.g., at least 300 degrees, such as at least 330 degrees). In such a manner, the heat exchanger 198 may effectively utilize the air passing through the fan duct 172 to cool one or more systems of the engine 100 (e.g., lubrication oil systems, compressor bleed air, electrical components, etc.). The heat exchanger 198 uses the air passing through duct 172 as a heat sink and correspondingly increases the temperature of the air downstream of the heat exchanger 198 and exiting the fan exhaust nozzle 178.

It will be appreciated, that for the purposes of discussion in the present disclosure, the ducted fan 184, the fan cowl 170, the inlet duct 180, and the fan duct 172 may all be considered part of the turbomachine 120.

It will be appreciated that the exemplary turbofan engine 100 depicted in FIG. 1 is provided by way of example only, and that in other embodiments, the turbofan engine 100 may have any other suitable configuration. For example, in other embodiments, the turbofan engine 100 may not include the fan duct 172/third stream, and as such may be configured as a "two stream" engine. Additionally, or alternatively, in other embodiments, the turbofan engine 100 may be configured as a direct drive engine (i.e., without the gearbox 155), as a fixed-pitch engine (i.e., without the pitch change mechanism 158), etc.

The turbofan engines of the present disclosure are generally designed to reduce noise propagation during operation of the turbofan engine. With an open rotor turbofan engine, such as the exemplary turbofan engine 100 described above with reference to FIG. 1, noise may propagate from a plurality of outlet guide vanes (see outlet guide vanes 162 of FIG. 1), as fan wakes having a nonuniform velocity from a rotor assembly impinge upon the plurality of outlet guide vanes. Such noise, sometimes referred to as fan-OGV interaction noise, is generally in the form of tonal noise at discrete frequencies related to the number of fan blades and rotational speed of the fan, and broadband noise due to fan wake turbulence. The inventors of the present disclosure have found that by modifying a circumferential spacing of outlet guide vanes relative to a notionally uniform spacing, an amount of noise generated and/or propagated from the outlet guide vanes may be reduced during operation of the turbofan engine. For example, by reducing the spacing of the outlet guide vanes, the tonal component of fan-OGV interaction noise may be reduced.

The inventors of the present disclosure have found that there exists an optimum number of outlet guide vanes ($N_{OGV}$) for a given fan blade count that results in the lowest level of tonal fan-OGV interaction noise. However, broadband fan-OGV interaction noise increases with outlet guide vane count. Since both tonal and broadband noise contribute to the overall fan-OGV interaction noise, an OGV count that results in the lowest level of tonal noise may not necessarily result in the quietest overall noise level. A means of reducing tonal noise independent of vane count is therefore desirable. The inventors of the present disclosure have found that the spacing of the outlet guide vanes rather than the total number of outlet guide vanes ($N_{OGV}$) themselves may govern the amount of tonal noise radiated to the far-field. Changing the spacing of the vanes towards a spacing equivalent to that obtained if the number of the outlet guide vanes were the same as the rotor blades may produce a reduction in tonal noise, without actually changing the number of outlet guide vanes.

Accordingly, the inventors of the present disclosure have further found that locally changing the circumferential spacing of the outlet guide vanes around certain azimuthal positions reduces tonal noise radiation to one or more target azimuthal locations far away from the outlet guide vanes. For example, the target areas may be, e.g., one or more noise sensitive ground locations, a cabin of an aircraft, etc.

Figure 2:
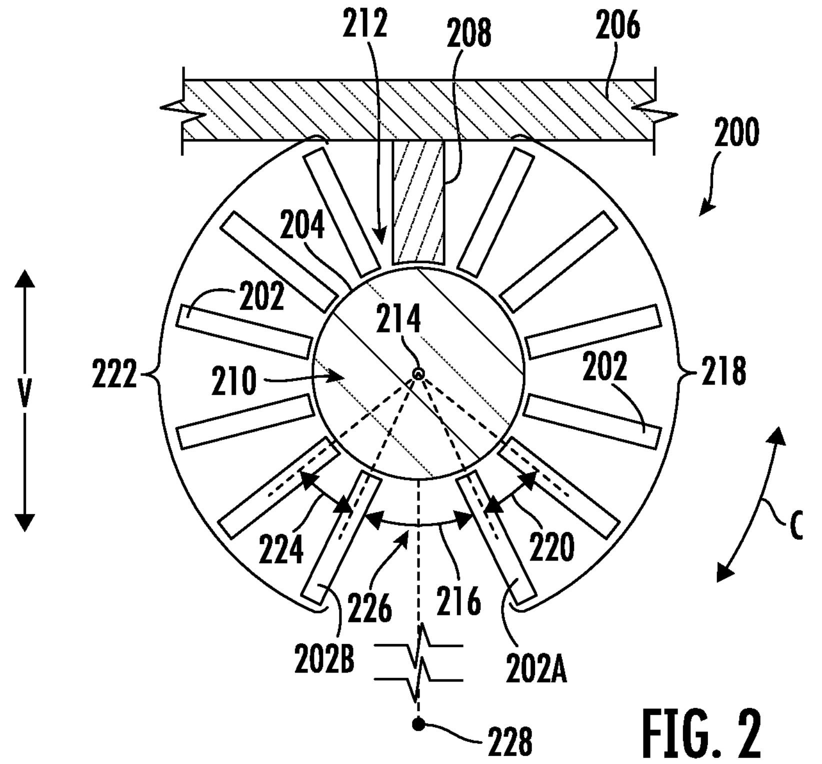
FIG. 2 is a schematic, forward-looking-aft view of a turbofan engine in accordance with an exemplary aspect of the present disclosure.

In particular, reference will now be made to FIG. 2. FIG. 2 depicts schematically a turbofan engine 200 in accordance with an exemplary aspect of the present disclosure having a plurality of outlet guide vanes 202 coupled to a cowl 204, with the turbofan engine 200 mounted to a wing 206 of an aircraft (other than the wing 206, not labeled or shown in FIG. 2) through a pylon 208. The turbofan engine 200 may be configured in substantially the same manner as exemplary turbofan engine 100 of FIG. 1. In such a manner, will be appreciated that the cowl 204 may be, e.g., a fan cowl (see fan cowl 170 of FIG. 1). Further, will be appreciated that the turbofan engine 200 includes a turbomachine 210. The turbomachine 210 may be configured in substantially the same manner as the turbomachine 120 of FIG. 1 and defines a pylon attachment location 212 along a circumferential direction C of the turbofan engine 200. The pylon 208 is coupled to the turbomachine 210 at the pylon attachment location 212. In the embodiment shown, the pylon attachment location 212 is positioned at a 12 o'clock position of the turbofan engine 200, also referred to as top dead center.

In other embodiments, it will be appreciated that the pylon 208 may be mounted on a side of the engine to enable an aft-fuselage mounting of the engine, in which case the pylon may be positioned at or near either 3 o'clock or 9 o'clock depending on which side of an aircraft the engine will be installed.

Briefly, it will be appreciated that the circumferential location nomenclature "o'clock" refers to locations along the circumferential direction C of the turbofan engine 200, as viewed from a forward-looking aft location. As mentioned, the 12 o'clock position refers to a top dead center position, or rather, a position aligned with a reference line extending from a longitudinal centerline 214 of the turbofan engine 200 and upward along a vertical direction V during a normal operational attitude of the turbofan engine 200 and aircraft incorporating the turbofan engine 200 (e.g., when the aircraft is parked on a level runway).

It will be appreciated that for the embodiment shown, the plurality of outlet guide vanes 202 includes $N_{OGV}$ number of outlet guide vanes 202. In particular, the plurality of outlet guide vanes 202 includes a first outlet guide vane 202A and a second outlet guide vane 202B adjacent the first outlet guide vane 202A (i.e., positioned with no outlet guide vanes 202 therebetween). The first outlet guide vane 202A and second outlet guide vane 202B together define a gap spacing 216 in the circumferential direction C. Briefly, it will further be appreciated that the pylon attachment location 212 is outside of between the first outlet guide vane 202A and the second outlet guide vane 202B along the circumferential direction C.

As used herein, the term "spacing" as used to describe an amount of space between adjacent outlet guide vanes 202, such as the gap spacing 216 between the first outlet guide vane 202A and the second outlet guide vane 202B, refers to an angle between a first reference line and a second reference line. The first reference line is a pitch change axis of the first outlet guide vane 202A and the second reference line is a pitch change axis of the second outlet guide vane 202B. In an embodiment with fixed-pitch outlet guide vanes 202, the first reference line may be a reference line extending from a leading edge of the first outlet guide vane 202A at a root of the first outlet guide vane 202A to the longitudinal centerline 214 of the turbofan engine 200, and the second reference line may be a reference line extending from a leading edge of the second outlet guide vane 202B at a root of the second outlet guide vane 202B to the longitudinal centerline 214 of the turbofan engine 200.

In the embodiment shown, the gap spacing 216 is greater than 360 degrees divided by $N_{OGV}$ (i.e., the number of outlet guide vanes 202. In such a manner, it will be appreciated that the plurality of outlet guide vanes 202 defines a nonuniform spacing along the circumferential direction C.

Referring still to FIG. 2, it will be appreciated that the plurality of outlet guide vanes 202 further includes a first cluster 218 of outlet guide vanes 202. It will be appreciated that the turbofan engine 200 further includes a rotor assembly having a plurality of unducted rotor blades (not shown in FIG. 2), the plurality of unducted rotor blades including a number $N_B$ of unducted rotor blades (not shown in FIG. 2; see, e.g., rotor blades 154 of FIG. 1, rotor blades 352 of FIG. 9). In the embodiment shown, $N_B$ is greater than $N_{OGV}$, such as between one and three greater, such as two greater. As discussed above, such may assist with a reduction of fan-OGV interaction noise during operation of the turbofan engine 200. The first cluster 218 of outlet guide vanes 202 defines a first cluster spacing 220 less than 360 divided by $N_{OGV}$ and greater than or equal to 360 divided by ($N_B$+2). As used herein, the term first cluster spacing 220 refers to the average spacing of each of the adjacent outlet guide vanes 202 in the first cluster 218 of outlet guide vanes 202.

The first cluster 218 of outlet guide vanes 202 includes the first outlet guide vane 202A. In certain embodiments, the first cluster 218 of outlet guide vanes 202 may include at least two outlet guide vanes 202, at least three outlet guide vanes 202, at least four outlet guide vanes 202, $N_{OGV}$ divided by two outlet guide vanes 202, and up to all of the plurality outlet guide vanes 202.

Referring still to FIG. 2, the plurality of outlet guide vanes 202 further includes a second cluster 222 of outlet guide vanes 202 defining a second cluster spacing 224. The second cluster spacing 224 is less than 360 divided by $N_{OGV}$ and greater than or equal to 360 divided by ($N_B$+2).

In certain exemplary aspects, the gap spacing 216 may be at least 25% greater than the first cluster spacing 220 and up to 200% of the first cluster spacing 220. For example, in certain exemplary aspects, the gap spacing 216 may be at least 50% greater than the first cluster spacing 220 such as at least 100% greater than the first cluster spacing 220, such as up to 150% of the first cluster spacing 220.

Referring still to FIG. 2, as briefly mentioned above, the exemplary turbofan engine 200 may be designed to reduce a noise propagation towards a noise sensitive target area. In particular, it will be appreciated that the exemplary turbofan engine 200 depicted defines an acoustically sensitive location 226 along the circumferential direction C, corresponding to an external targeted noise reduction location 228. In the embodiment shown, the acoustically sensitive location 226 is positioned between the first outlet guide vane 202A and the second outlet guide vane 202B. More specifically, the acoustically sensitive location 226 is positioned at a six o'clock position. In such a manner, the exemplary turbofan engine 200 depicted is configured to reduce an amount of noise propagation from the outlet guide vanes 202 downwardly during operation of the turbofan engine 200, reducing an amount of noise experienced during, e.g., a flyover event of an aircraft including the turbofan engine 200 of FIG. 2.

It will be appreciated, however, that in other embodiments, the turbofan engine 200 may define an acoustically sensitive location 226 at other positions along the circumferential direction C. For example, referring now to FIG. 3, a turbofan engine 200 in accordance with another exemplary embodiment of the present disclosure is provided. The exemplary turbofan engine 200 of FIG. 3 may be configured in substantially the same manner as exemplary turbofan engine 200 of FIG. 2.

Figure 3:
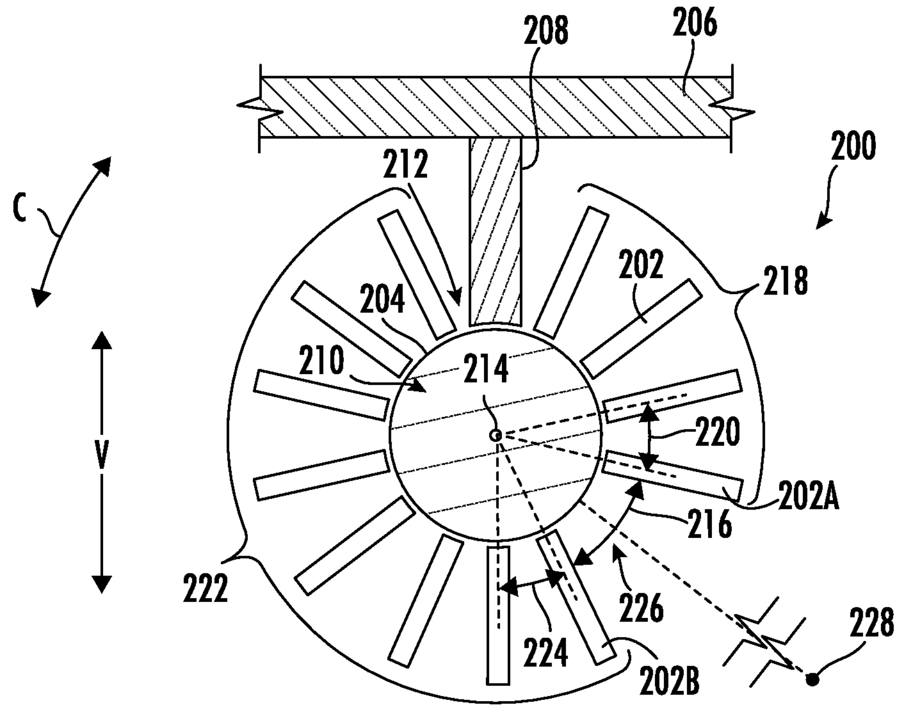
FIG. 3 is a schematic, forward-looking-aft view of a turbofan engine in accordance with another exemplary aspect of the present disclosure.

For example, the exempt turbofan engine 200 of FIG. 3 includes a plurality of outlet guide vanes 202, the plurality of outlet guide vanes 202 including a first outlet guide vane 202A and a second outlet guide vane 202B defining a gap spacing 216. Additionally, the exemplary turbofan engine 200 of FIG. 3 also defines an acoustically sensitive location 226 along the circumferential direction C between the first outlet guide vane 202A and the second outlet guide vane 202B, corresponding to an external targeted noise reduction location 228.

However, for the embodiment of FIG. 3, the acoustically sensitive location 226 is positioned between a three o'clock position and a five o'clock position. In such a manner, it will be appreciated that the exemplary turbofan engine 200 of FIG. 3 may be configured to reduce an amount of noise propagation from the outlet guide vanes 202 laterally outward during operation of the turbofan engine 200, reducing an amount of noise experienced from, e.g., a sideline acoustically sensitive location during operation of an aircraft incorporating the exemplary turbofan engine 200 of FIG. 3.

Figure 4:
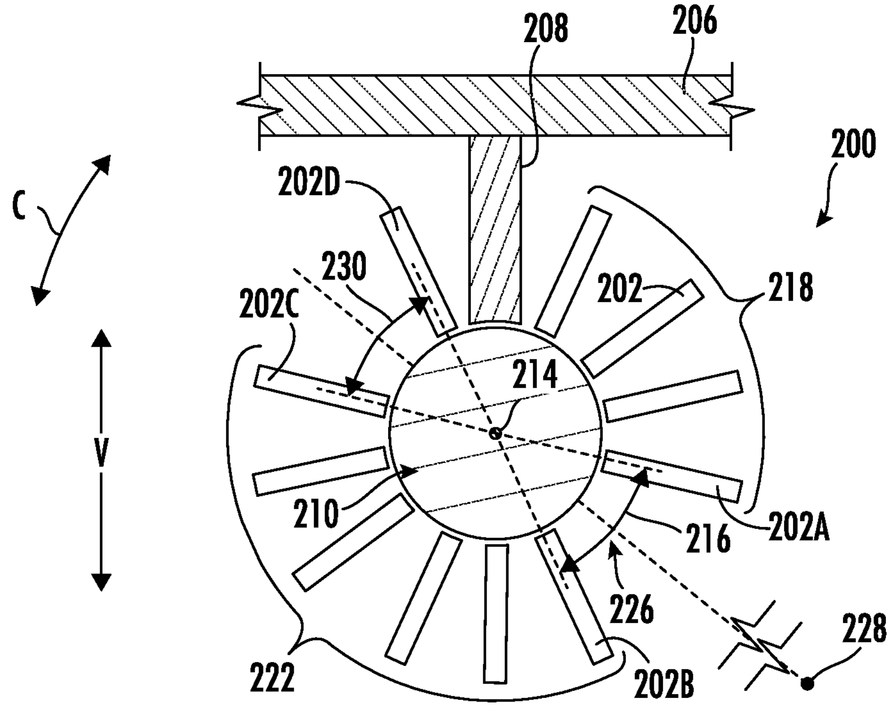
FIG. 4 is a schematic, forward-looking-aft view of a turbofan engine in accordance with yet another exemplary aspect of the present disclosure.

Further, it will be appreciated that in certain exemplary embodiments, the plurality of outlet guide vanes 202 may include an outlet guide vane 202 removed at a location opposite the first outlet guide vane 202A and the second outlet guide vane 202B to provide, e.g., symmetry for the turbofan engine 200. For example, referring now briefly to FIG. 4, a turbofan engine 200 in accordance with yet another exemplary embodiment of the present disclosure is provided. The exemplary turbofan engine 200 of FIG. 4 may be configured in substantially the same manner as exemplary turbofan engine 200 of FIG. 3. However, for the embodiment of FIG. 4, the plurality of outlet guide vanes 202 further includes a third outlet guide vane 202C and a fourth outlet guide vane 202D positioned opposite the first outlet guide vane 202A and second outlet guide vane 202B, respectively (i.e., being the closest outlet guide vane to a 180 degree spacing from the respective outlet guide vane 202). The third outlet guide vane 202C and the fourth outlet guide vane 202D define a spacing 230 within 20% of the gap spacing 216 defined by the first outlet guide vane 202A and the second outlet guide vane 202B, such as within 10% of the gap spacing 216, such as within 5% of the gap spacing 216. In such a manner, the plurality of outlet guide vanes 202 may produce a more uniform back pressure on the fan blades (e.g., fan blades 154 in the embodiment of FIG. 1) of the turbofan engine 200.

Figure 5:
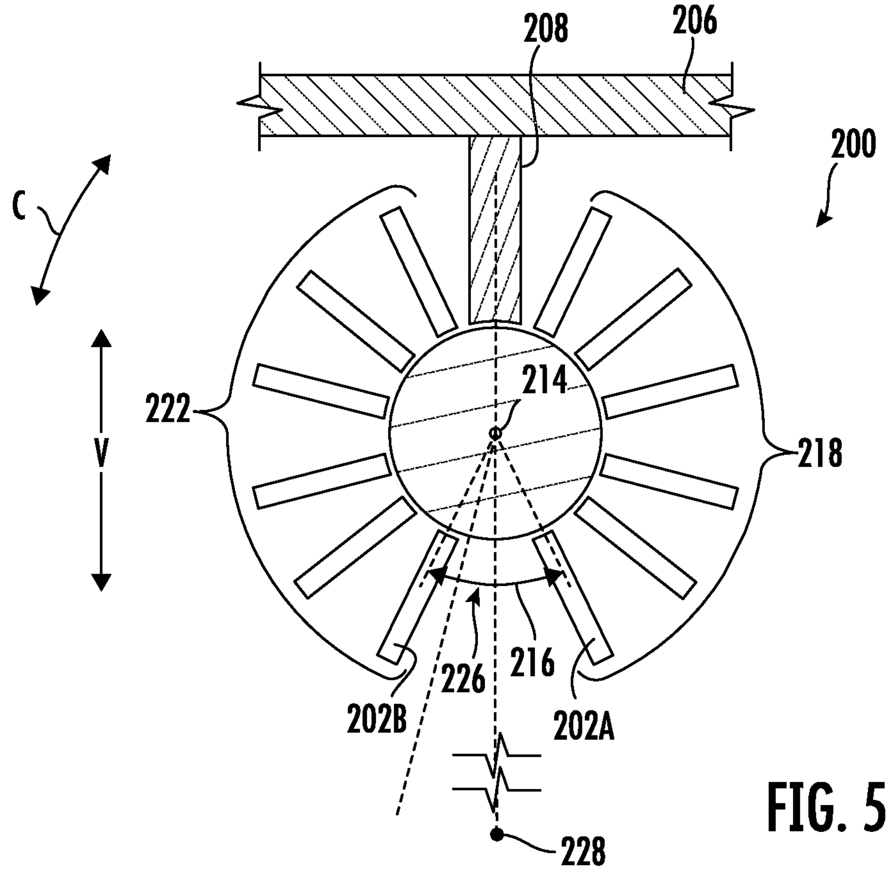
FIG. 5 is a schematic, forward-looking-aft view of a turbofan engine in accordance with still another exemplary aspect of the present disclosure.

Further, still, it will be appreciated that in still other exemplary embodiments, a turbofan engine 200 may be provided having a plurality of outlet guide vanes 202 including a first outlet guide vane 202A and a second outlet guide vane 202B at circumferential locations to allow an acoustically sensitive location 226 therebetween at other desired positions. For example, referring briefly to FIG. 5, an exemplary turbofan engine 200 is depicted having an acoustically sensitive location 226 between a first outlet guide vane 202A and a second outlet guide vane 202B at a five o'clock position.

It will be appreciated, that as used herein, the term "at" with reference to a location of the acoustically sensitive location 226 and/or an external targeted noise reduction location 228 refers to the location 226, 228 being within 15 degrees of the specified circumferential position. Further, it will be appreciated that the "acoustically sensitive location 226" refers to a position halfway between the first outlet guide vane 202A and the second outlet guide vane 202B.

Figure 6:
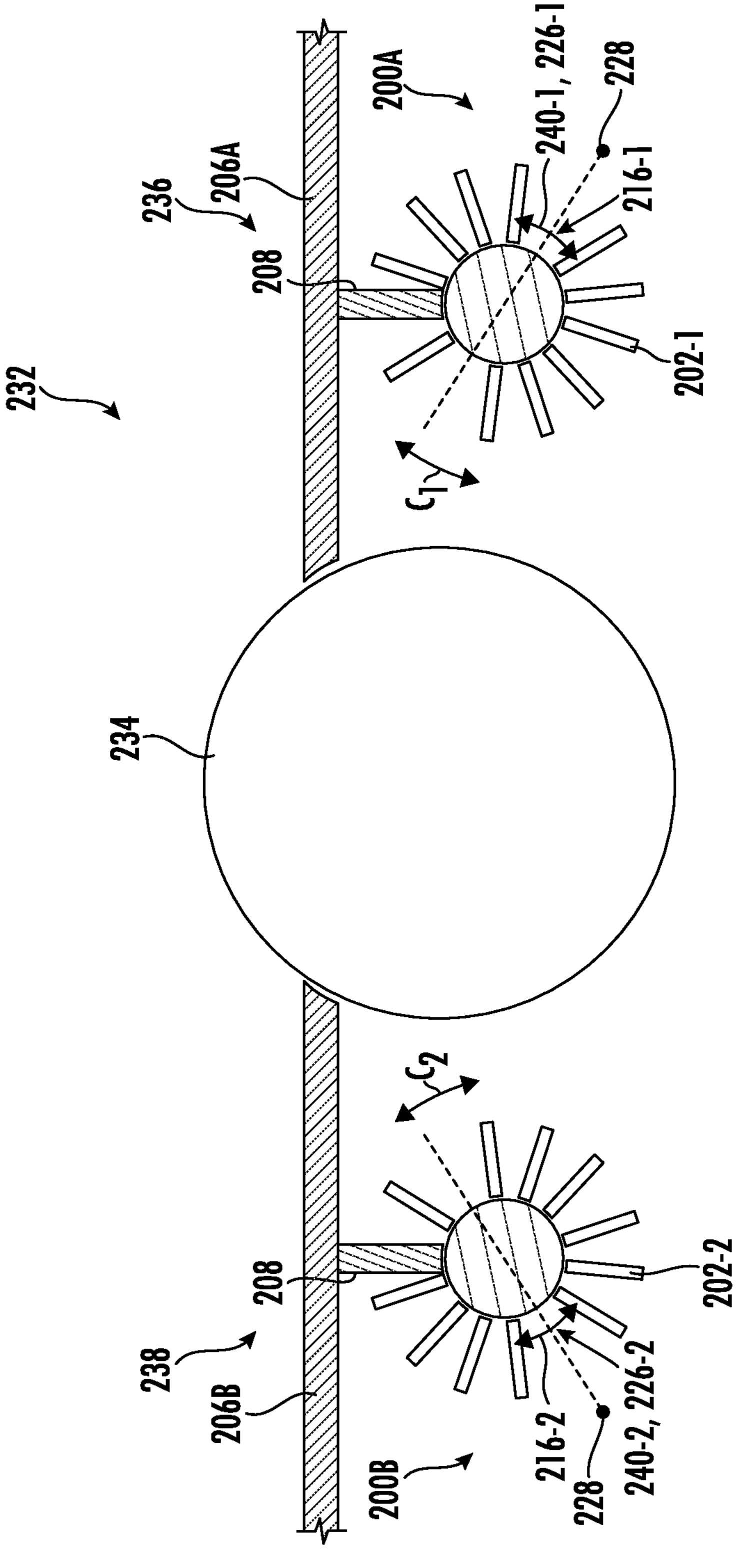
FIG. 6 is a schematic, forward-looking-aft view of an aircraft having a plurality of turbofan engines in accordance with an exemplary aspect of the present disclosure.

Referring now to FIG. 6, an aircraft 232 is provided in accordance with an exemplary embodiment of the present disclosure. The exemplary aircraft 232 generally includes a fuselage 234 defining a first side 236 and a second side 238. The first side 236 of the fuselage 234 may be a port side of the fuselage 234 and the second side 238 of the fuselage 234 may be a starboard side of the fuselage 234. In such a manner, it will be appreciated that the view of FIG. 6 is a forward-looking-aft view of the aircraft 232. The aircraft 232 further includes a first wing 206A extending from the first side 236 of the fuselage 234 and a second wing 206B extending from a second side 238 of the fuselage 234.

The aircraft 232 further includes a propulsion system. The propulsion system includes a first turbofan engine 200A mounted to the first wing 206A or to the fuselage 234 on the first side 236 of the fuselage 234 and a second turbofan engine 200B mounted to the second wing 206B or the fuselage 234 on the second side 238 of the fuselage 234. For the embodiment shown, the first turbofan engine 200A and the second turbofan engine 200B are mounted to the first wing 206A and the second wing 206B, respectively, in and under-wing configuration using respective pylons 208.

The first turbofan engine 200A defines a first circumferential direction $C_1$ and includes a first unducted rotor assembly (not shown) and a first plurality of outlet guide vanes 202-1 positioned downstream of the first unducted rotor assembly (see, e.g., FIG. 1). Similarly, the second turbofan engine 200B defines a second circumferential direction $C_2$ and includes a second unducted at rotor assembly (not shown) and a second plurality of outlet guide vanes 202-2 positioned downstream of the second unducted rotor assembly (see, e.g., FIG. 1).

The first plurality of outlet guide vanes 202-1 includes $N_{OGV1}$ number of outlet guide vanes 202-1 and defines a first gap spacing 216-1 at a first gap location 240-1 along the first circumferential direction $C_1$, and the second plurality of outlet guide vanes 202-2 includes $N_{OGV2}$ number of outlet guide vanes 202-2 and defines a second gap spacing 216-2 at a second gap location 240-2 along the second circumferential direction $C_2$. The first gap spacing 216-1 is greater than 360 degrees divided by a number of the first plurality of outlet guide vanes 202-1, and the second gap spacing 216-2 is similarly greater than 360 degrees divided by number of the second plurality of outlet guide vanes 202-2.

The first gap location 240-1 is between a two o'clock position and a seven o'clock position, and the second gap location 240-2 is between a five o'clock position and a 10 o'clock position. In particular, for the embodiment shown, the first gap location 240-1 is between a three o'clock position and a six o'clock position and the second gap location 240-2 is between a six o'clock position and a nine o'clock position.

As will be appreciated, the first gap location 240-1 may correspond to a first acoustically sensitive location 226-1 of the first turbofan engine 200A, and the second gap location 240-2 may correspond to a second acoustically sensitive location 226-2 of the second turbofan engine 200B. The first turbofan engine 200A therefore defines the first acoustically sensitive location 226-1 along the circumferential direction C positioned at the first gap location 240-1 and the second turbofan engine 200B defines the second acoustically sensitive location 226-2 along the circumferential direction C positioned at the second gap location 240-2.

In such a manner, it will be appreciated that the propulsion system of the aircraft 232 depicted in FIG. 6 may be configured to reduce an amount of noise propagation at laterally outward locations of the aircraft 232, reducing an amount of noise experienced from opposing sideline positions (labeled 228) during operation of the aircraft 232.

Figure 7:
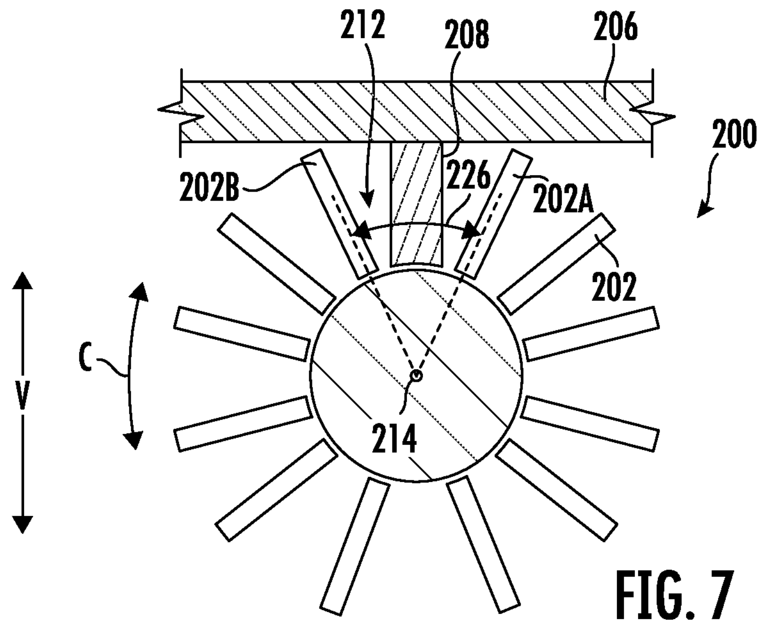
FIG. 7 is a schematic, forward-looking-aft view of a turbofan engine in accordance with yet another exemplary aspect of the present disclosure.

Referring now to FIG. 7, a turbofan engine 200 in accordance with yet another exemplary embodiment of the present disclosure is provided. It will be appreciated that for the embodiment of FIG. 7, the turbofan engine 200 may be configured in a similar manner as the exemplary turbofan engine 200 of FIG. 2, and the same or similar numbers may refer to the same or similar parts.

Figure 8:
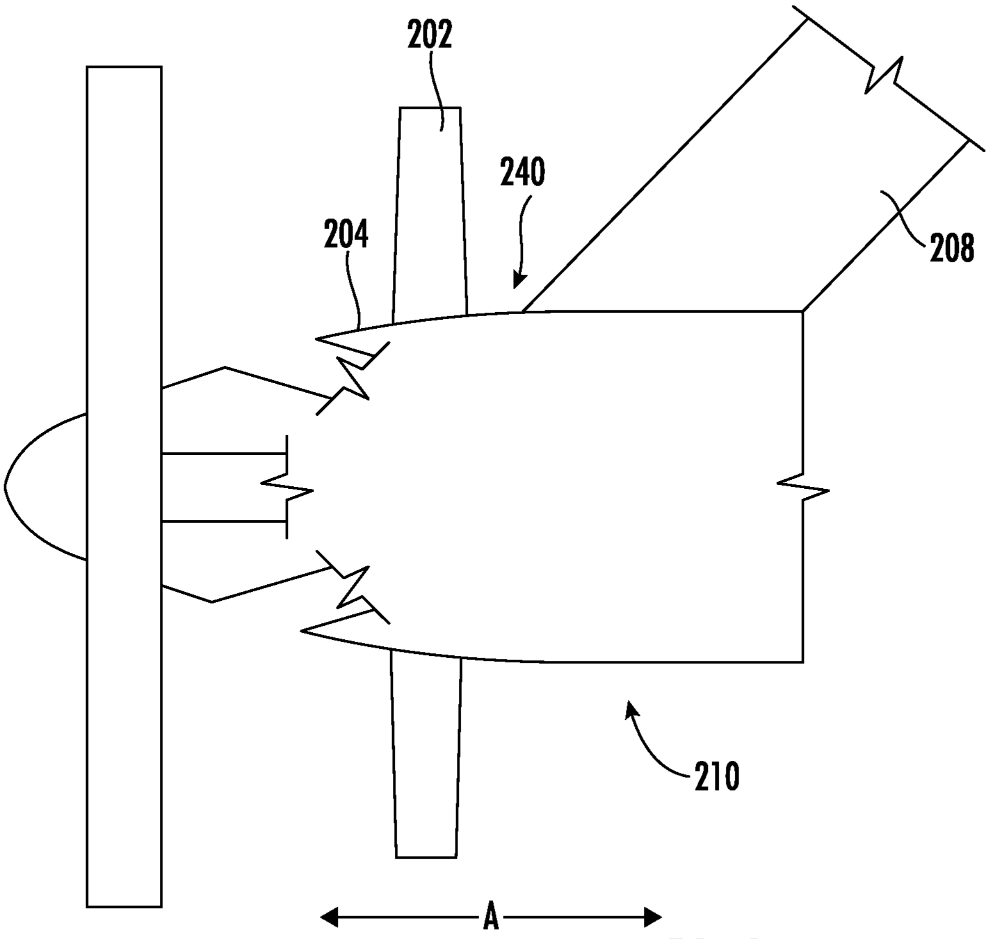
FIG. 8 is a schematic, side view of a portion of the exemplary turbofan engine of FIG. 7.

For example, the exemplary turbofan engine 200 of FIG. 7 generally includes a plurality of outlet guide vanes 202. Further, the turbofan engine 200 is coupled to a wing 206 of an aircraft (not shown other than wing 206) through a pylon 208. In such a manner, it will be appreciated that the turbofan engine 200 generally includes a turbomachine 210 defining a pylon attachment location 212 along a circumferential direction C of the turbofan engine 200. Further, referring briefly to FIG. 8, providing a schematic view of a portion of the turbofan engine 200 and pylon 208 of FIG. 7 from a side, it will be appreciated that the turbofan engine 200 further defines a pylon attachment location 240 along an axial direction A of the turbofan engine 200. The pylon attachment location 240 in the embodiment of FIGS. 7 and 8 is located aft of the plurality of outlet guide vanes 202. In particular, the pylon attachment location 240 refers to a forward-most location where the pylon 208 meets the turbomachine 120, and is aft of an aft-most portion of the plurality of outlet guide vanes 202 depicted.

It will be appreciated, however, that in other exemplary embodiments of the present disclosure, the pylon attachment location 240 may not be positioned aft of the plurality of outlet guide vanes 202, and instead may be positioned at least partially between two outlet guide vanes 202 of the plurality of outlet guide vanes 202.

Figure 9:
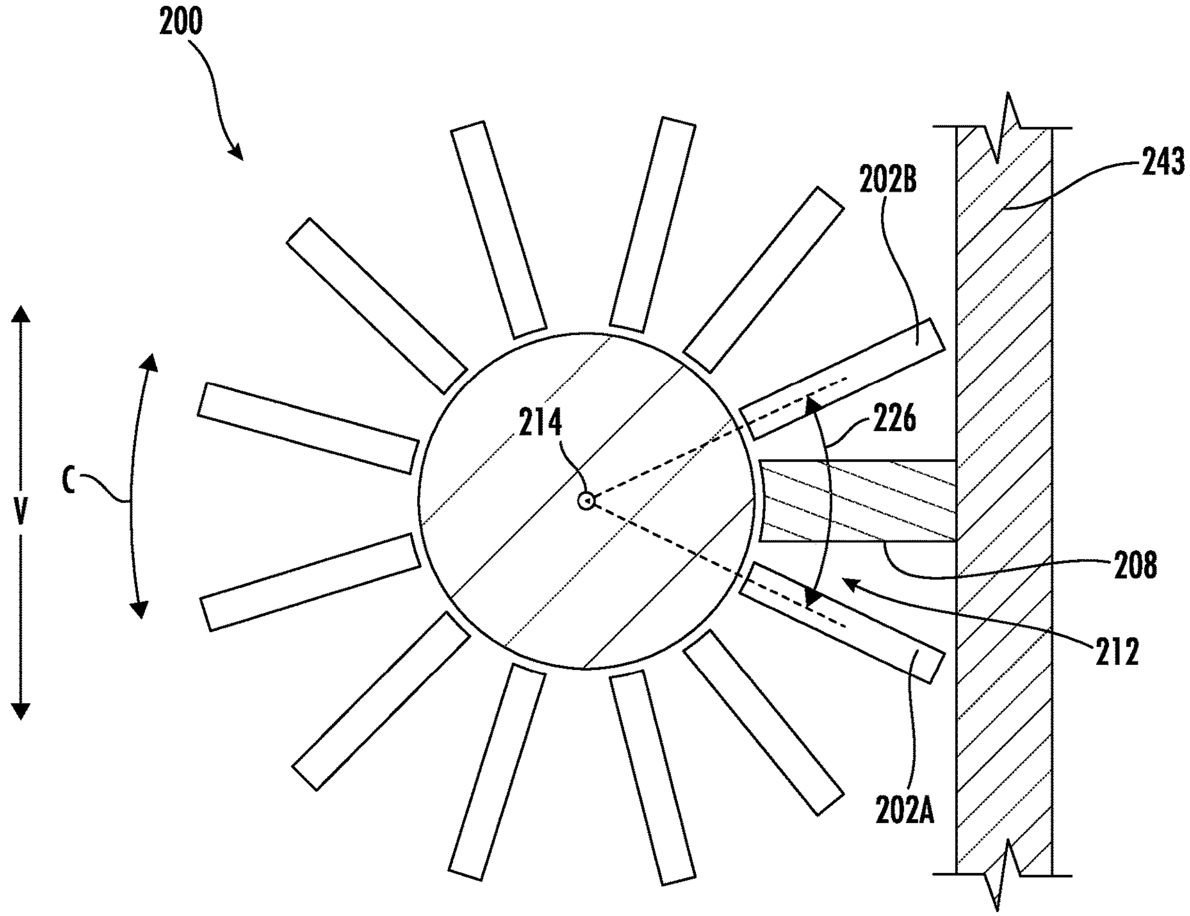
FIG. 9 is a schematic, forward-looking-aft view of a turbofan engine in accordance with still another exemplary aspect of the present disclosure.

Referring back to FIG. 7, it will be appreciated that the plurality of outlet guide vanes 202 includes $N_{OGV}$ number of outlet guide vanes 202 which, as with the embodiments above, is less than a number $N_B$ of the plurality of unducted rotor blades of an unducted rotor assembly of the turbofan engine 200 (see, e.g., FIG. 1, FIG. 9).

The plurality of outlet guide vanes 202 in FIG. 7 includes a first outlet guide vane 202A and a second outlet guide vane 202B (e.g., a first pair of outlet guide vanes 202) defining a gap spacing 216 less than $360/N_{OGV}$ and greater than or equal to $360/(N_B+2)$. For example, the spacing may be greater than or equal to $360/(N_B+1)$, such as greater than or equal to $360/N_B$. For the embodiment depicted in FIG. 7, the pylon attachment location 212 along the circumferential direction C is positioned between the first and second outlet guide vanes 202A, 202B, at a 12 o'clock position.

As discussed above, the exemplary embodiment of FIG. 7 may allow for a lower count of outlet guide vanes 202 relative to the number of rotor blades, which may generally reduce a broadband noise generated by the turbofan engine 200 during operation of the turbofan engine 200.

As will be appreciated, such a configuration may equally apply to other engine mounting locations. For example, referring briefly to FIG. 9, a turbofan engine 200 is depicted coupled to an aircraft structure 243 through a pylon 208. For the embodiment FIG. 9, the pylon 208 couples to the turbofan engine 200 at a side location, such as a three o'clock position (or alternatively at a nine o'clock position) of the turbofan engine 200. With such a configuration, the pylon 208 may be coupling the turbofan engine 200 directly to a fuselage of an aircraft (such as to the fuselage 234 of the aircraft 232 in FIG. 6), e.g., at an aft end of the aircraft.

As mentioned above, the turbofan engines of the present disclosure are generally designed to reduce noise propagation during operation of the turbofan engine. With an open rotor turbofan engine, such as the exemplary turbofan engine 300 described above with reference to FIG. 1, noise from operation of the rotor assembly may propagate from a plurality of outlet guide vanes, as flow having a nonuniform velocity from the rotor assembly impinges upon the plurality of outlet guide vanes. In particular, with an open rotor configuration, tip vortices from the plurality of rotor blades of the rotor assembly may travel downstream and contact the outlet guide vanes. When these tip vortices contact the outlet guide vanes, undesirable noise may propagate from the outlet guide vanes.

The inventors of the present disclosure have found that during at least certain operating conditions of the turbofan engine, the tip vortices from the rotor blades may not travel in a uniform way from the rotor blades to the outlet guide vanes along a circumferential direction of the turbofan engine.

Moreover, the inventors of the present disclosure have found that a useful way to reduce an amount of noise propagation from the turbofan engine may be to reduce a span of the outlet guide vanes to reduce an amount of contact between the tip vortices of the rotor blades and the outlet guide vanes, to therefore reduce the amount of noise propagation. However, reducing the span of the outlet guide vanes such that the tip vortices from the rotor blades do not contact the outlet guide vanes during the above-noted operating conditions may result in an undesirable reduction in a propulsive efficiency of the turbofan engine. Therefore, a means of reducing the noise radiated from the outlet guide vanes without excess reduction in efficiency is desirable.

Accordingly, the inventors of the present disclosure have found that incorporating outlet guide vanes having a non-uniform span along the circumferential direction may allow for a reduction in noise propagation during the above-noted operating conditions at desired circumferential targets, without excessively reducing a propulsive efficiency of the turbofan engine. In particular, the inventors of the present disclosure have found a relationship between various turbofan engine parameters and turbofan engine operating conditions to determine a desired location of an outlet guide vane having the shortest span to most efficiently reduce noise propagation during the above-noted operating conditions at desired circumferential target locations, without excessively reducing a propulsive efficiency of the turbofan engine during other operating conditions.

Figure 10:
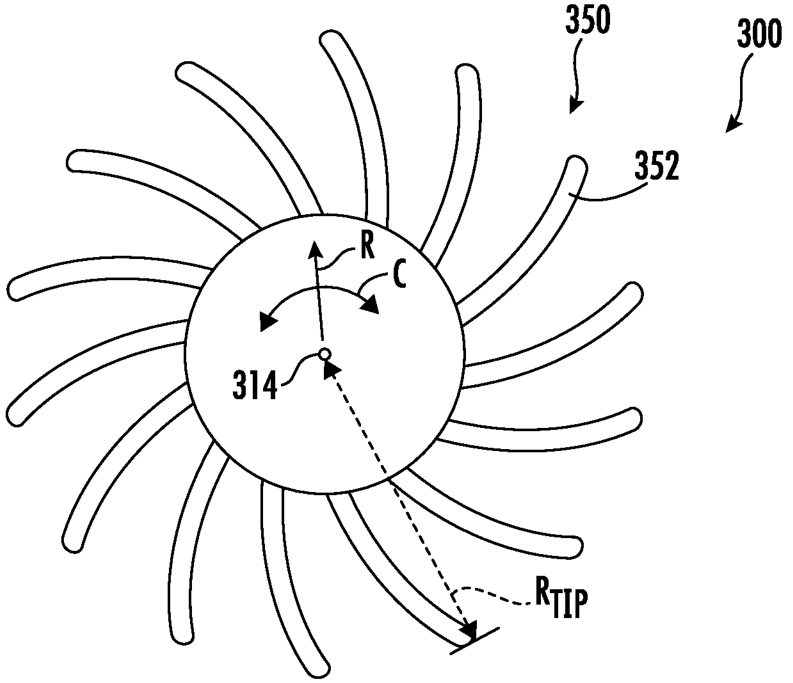
FIG. 10 is a schematic, forward-looking-aft view of a rotor assembly of a turbofan engine in accordance with another exemplary aspect of the present disclosure.
Figure 11:
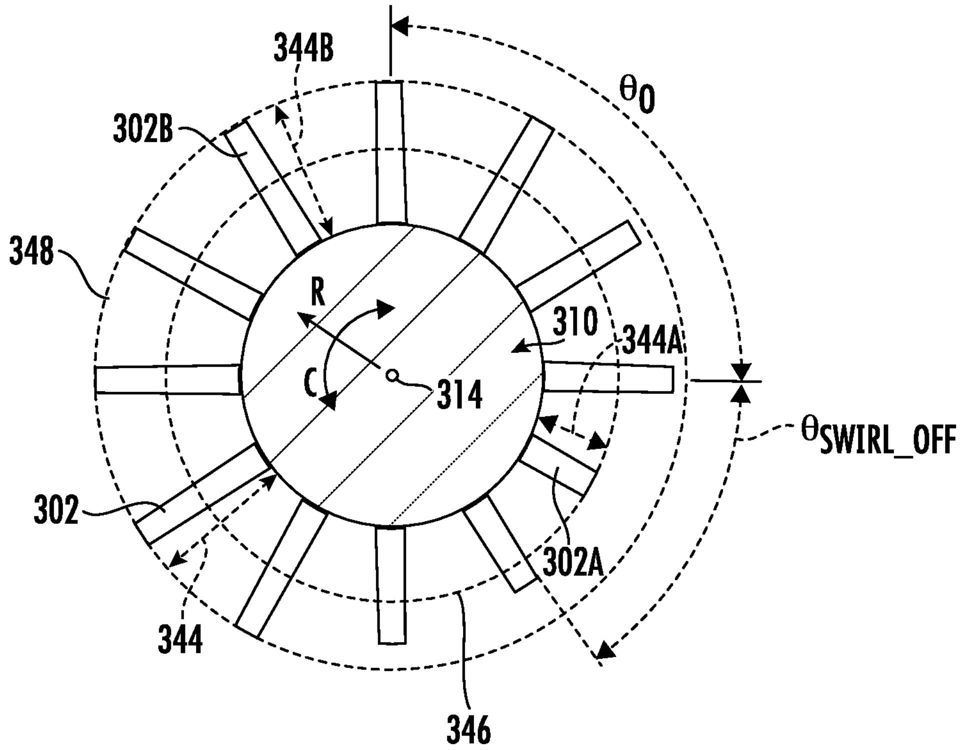
FIG. 11 is a schematic, forward-looking-aft view of a plurality of outlet guide vanes coupled to a cowl of a turbomachine of the exemplary turbofan engine of FIG. 10.

Referring now in particular to FIGS. 10 and 11, aspects of a turbofan engine 300 in accordance with an exemplary embodiment of the present disclosure is provided. In particular, FIG. 10 depicts a rotor assembly 350 of the turbofan engine 300 having a plurality of rotor blades 352, and FIG. 11 depicts a plurality of outlet guide vanes 302 of the turbofan engine 300. The turbofan engine 300, including the rotor assembly 350 and outlet guide vanes 302, of FIGS. 10 and 11 may be configured in a similar manner as the exemplary turbofan engines 100, 200 described above.

For example, the turbofan engine 300 generally additionally includes a turbomachine 310 (see FIG. 11) and defines a longitudinal centerline 314, a circumferential direction C, a radial direction R, and an axial direction A (not depicted in FIGS. 10 and 11). Further, referring particular to FIG. 11, the plurality of outlet guide vanes 302 each define a span 344. The spans 344 of the plurality of outlet guide vanes 302 are nonuniform along a circumferential direction C.

In particular, for the embodiment shown, the plurality of outlet guide vanes 302 includes a first outlet guide vane 302A with a first span 344A that is not greater than the spans 344 of the other outlet guide vanes 302 of the plurality of outlet guide vanes 302. In other words, the first span 344A of the first outlet guide vane 302A is the shortest outlet guide vane 302 (or one of the shortest outlet guide vanes 302). A reference line 346 is provided for illustrative purposes in FIG. 11 to show a height of the first span 344A relative to the spans 344 of the other outlet guide vanes 302.

In the embodiment of FIGS. 10 and 11, a circumferential position of the first outlet guide vane 302A (FIG. 11) is determined based on a location of a most overloaded rotor blade 352 of the plurality of rotor blades 352 of the rotor assembly 350 (FIG. 10) when the rotor assembly 350 is subject to a distorted inflow. In such a manner, the first outlet guide vane 302A may be designed to miss a relatively highly loaded tip vortex from the most overloaded rotor blade 352 during an operating condition of the turbofan engine 300.

More specifically, the inventors of the present disclosure have determined the location for the first outlet guide vane 302A based on an initial circumferential location of a most overloaded rotor blade 352 of the plurality of rotor blades 352, $\theta_0$, along with a circumferential swirl offset, $\theta_{SWIRL\_OFF}$, based on anticipated swirl of the tip vortex from the most overloaded rotor blade 352 at initial circumferential location, $\theta_0$. Notably, a 0 degrees circumferential position corresponds to a 12 o'clock position in the views depicted. Also, all 0 parameters are in units of degrees relative to the 12 o'clock position, increasing in the direction of rotation of the rotor assembly/fan.

The most overloaded rotor blade 352 during an operating condition of the turbofan engine 300 may depend on the operating condition of the turbofan engine 300. In particular, for the embodiment of FIGS. 10 and 11, the operating condition to which the present disclosure is designed is a high angle of attack operating condition, such as take-off or climb.

In particular, for the embodiment of FIG. 10, the rotor assembly 350 is configured to rotate in a clockwise direction with the angle of attack such that there is a vertically upward component of velocity at the inflow to the rotor assembly 350. In such a manner, the plurality of rotor blade 352 passing through a three o'clock position may be the most highly loaded rotor blade 352 of the plurality of rotor blades 352. For example, the rotor blade 352 passing through the three o'clock position may experience the highest relative angle of attack due to the rotational direction of the plurality of rotor blades 352. By contrast, the rotor blade 352 passing through a nine o'clock position may experience the lowest relative angle of attack due to the rotational direction of the plurality of rotor blades 352, and thus may be the least loaded rotor blade 352 of the plurality of rotor blades 352.

Referring still FIGS. 10 and 11, it will be appreciated that the unducted rotor assembly 350 defines a tip radius, $R_T$IP, and the turbofan engine 300 defines an axial spacing, S, between the plurality of unducted rotor blades 352 and the plurality of outlet guide vanes 302 (see spacing 166 in FIG. 1). In addition, the rotor assembly 350 defines an advance ratio, J. The advance ratio, J, is defined as $$\frac{V_{INF}}{nD},$$

where $V_{INF}$ is the flight velocity of the turbofan engine 300, n is a rotational speed of the rotor assembly 350 in units of rotations per second, and D is the diameter of the rotor assembly 350 (i.e., two times the tip radius, $R_{TIP}$).

The circumferential swirl offset, $\theta_{SWIRL\_OFF}$, is calculated based on the following relationship:

$$2\times\tan^{-1}\left(\frac{\pi\times S}{J\times R_{TIP}}\right).$$

For the embodiment shown, the first outlet guide vane 302A is located at a circumferential position between $\theta_0$ and $\theta_{SWIRL\_OFF}$, where $\theta_{SWIRL\_OFF}$ is defined in the direction of rotation of the fan. More specifically, for the embodiment shown, the first outlet guide vane 302A is located at a circumferential position equal to $\theta_0$ plus $\theta_{SWIRL\_OFF}$ divided by 2. As will be appreciated, the position $\theta_0$ is indicative of where a wake from the highest loaded rotor blade 352 starts. It was found that a range from $\theta_0$ to $\theta_{SWIRL\_OFF}$ identifies the region where a wake can pass through a plane defined by the plurality of outlet guide vanes 302. This angular range can encompass one, two or three outlet guide vanes succeeding the highest loaded blade in some embodiments.

By positioning the first outlet guide vane 302A at such a circumferential location, the first outlet guide vane 302A may be configured to be radially inboard of the tip vortices from the plurality of rotor blades 352 passing through the most highly loaded position of the rotor assembly 350 for the turbofan engine operating condition, therefore reducing an amount of tonal noise generated.

Notably, for the embodiment of FIGS. 10 and 11, the plurality of outlet guide vanes 302 further includes a second outlet guide vane 302B with a second span 344B not shorter than the spans 344 of the other outlet guide vanes 302. Accordingly, the second outlet guide vane 302B is the longest outlet guide vane 302 (or, e.g., one of the longest outlet guide vanes 302). The second outlet guide vane 302B is located at a circumferential position between 150 degrees and 210 degrees offset from the first outlet guide vane 302A in the embodiment of FIGS. 10 and 11. A reference line 348 is provided for illustrative purposes in FIG. 11 to show a height of the second span 344B relative to the spans 344 of the other outlet guide vanes 302.

In such manner, the second outlet guide vane 302B may extend outwardly along the radial direction R to a span extent required for optimum efficiency and mitigating the performance reduction associated with the shorter first outlet guide vane 302A.

Figure 12:
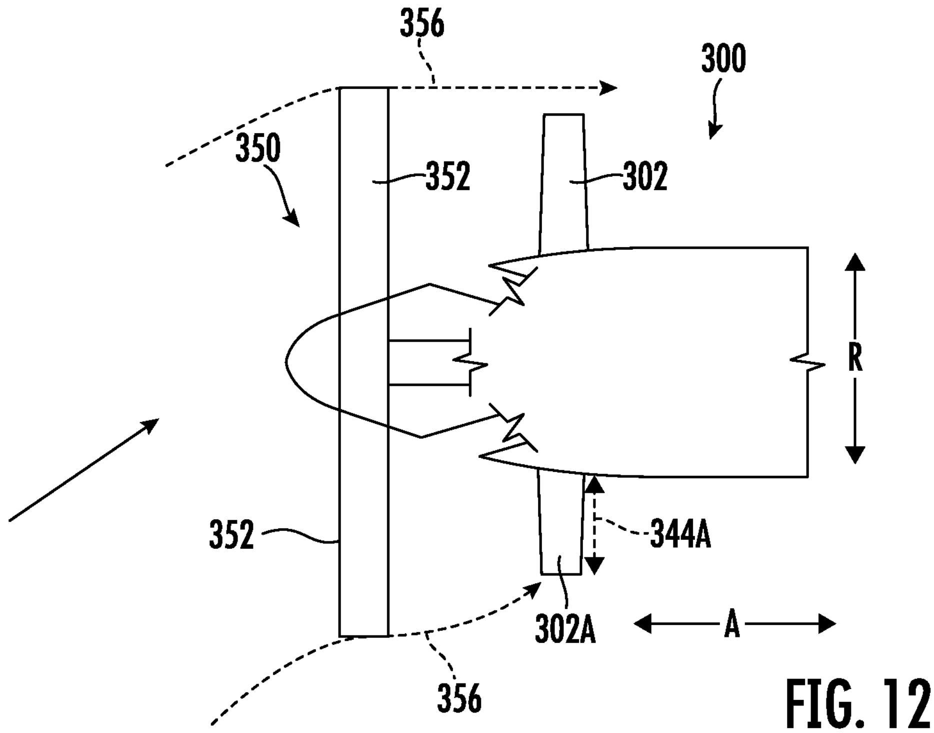
FIG. 12 is a schematic, forward-looking-aft view of a rotor assembly of a turbofan engine in accordance with yet another exemplary aspect of the present disclosure.
Figure 13:
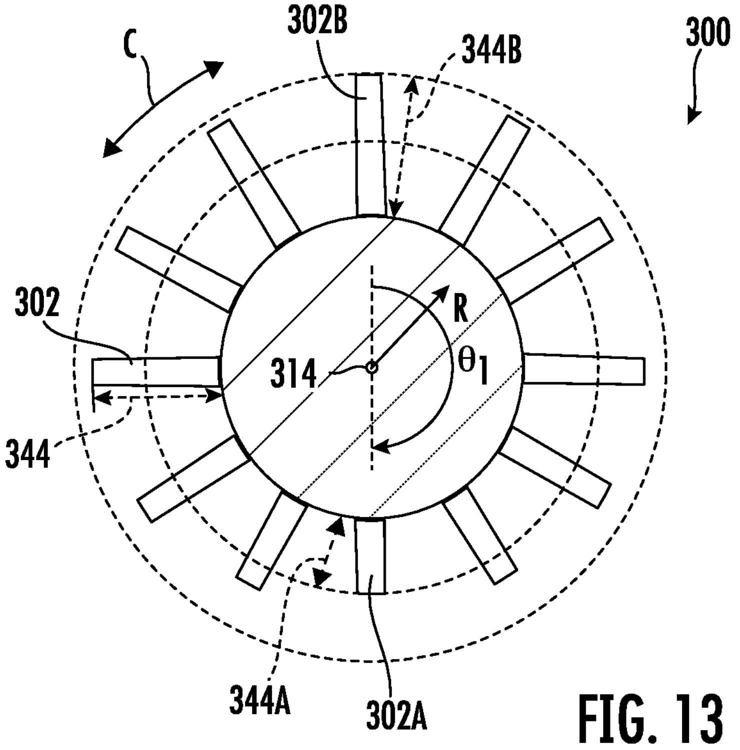
FIG. 13 is a schematic, forward-looking-aft view of a plurality of outlet guide vanes coupled to a cowl of a turbomachine of the exemplary turbofan engine of FIG. 12.

Referring now particularly to FIGS. 12 and 13, a turbofan engine 300 in accordance with another exemplary embodiment of the present disclosure is provided. In particular, FIG. 12 provides a side, schematic view of the turbofan engine 300 during an operating condition, and FIG. 13 depicts a plurality of outlet guide vanes 302 of the turbofan engine 300 of FIG. 12. The turbofan engine 300 and a rotor assembly 350 of the turbofan engine 300 depicted in FIGS.

12 and 13 may be configured in a similar manner as exemplary turbofan engines 100, 200, 300 described above.

As with the embodiment of FIGS. 10 and 11, the plurality of outlet guide vanes 302 depicted in FIGS. 12 and 13 each define a span 344. The spans 344 of the plurality of outlet guide vanes 302 are nonuniform along the circumferential direction C (see FIG. 13). In particular, for the embodiment shown, the plurality of outlet guide vanes 302 includes a first outlet guide vane 302A with a first span 344A that is not greater than the spans 344 of the other outlet guide vanes 302 of the plurality of outlet guide vanes 302. In other words, the first span 344A of the first outlet guide vane 302A is the shortest outlet guide vane 302 (or one of the shortest outlet guide vanes 302) (see FIG. 13).

In the embodiment of FIGS. 12 and 13, a circumferential position of the first outlet guide vane 302A is determined based on a location at which a streamtube 356 from the rotor assembly 350 contracts inwardly along the radial direction R a maximum amount. Referring particularly to FIG. 12, the streamtube 356 from the rotor assembly 350 is depicted in phantom. During a turbofan engine operating condition, the unducted rotor assembly 350 defines a location of highest inward deflection of the streamtube, $\theta_1$. The first outlet guide vane 302A having the first span 344A not greater than the spans 344 of the other outlet guide vanes 302 is located within 30 degrees of $\theta_1$ (see FIG. 13).

In particular, for the embodiment depicted, the turbofan engine operating condition is a high angle-of-attack operating condition, such as take-off or climb. With such an operating condition, $\theta_1$ equals 180 degrees from top dead center, i.e., a six o'clock position (see FIG. 13). In such a manner, the first outlet guide vane 302A is configured to extend beneath an inward radial deflection of the streamtube 356 during the turbofan engine operating condition, to reduce an acoustic impact of such streamtube 356 on the outlet guide vanes 302 (see FIG. 12).

It will be appreciated, however, that in other exemplary embodiments, the plurality of outlet guide vanes 302 may include the first outlet guide vane 302A with the first span 344A not greater than the spans 344 of the other outlet guide vanes 302 at other suitable locations. For example, there may be one more features of the turbofan engine 300, and/or a mounting of the turbofan engine 300, that affect aerodynamic flow field of the turbofan engine 300, and thus acoustic radiation of the turbofan engine 300.

Figure 14:
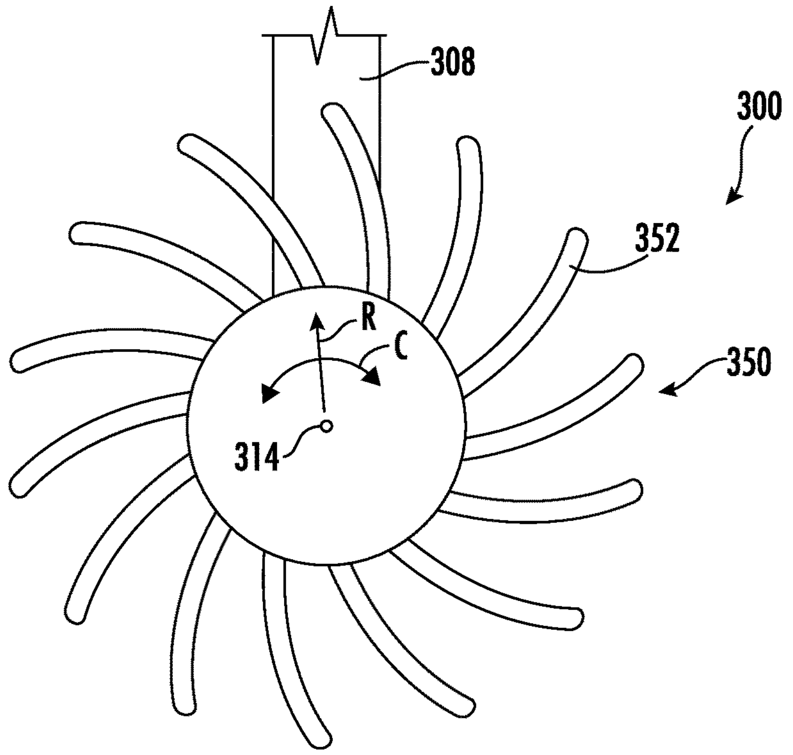
FIG. 14 is a schematic, forward-looking-aft view of a rotor assembly of a turbofan engine in accordance with still another exemplary aspect of the present disclosure.
Figure 15:
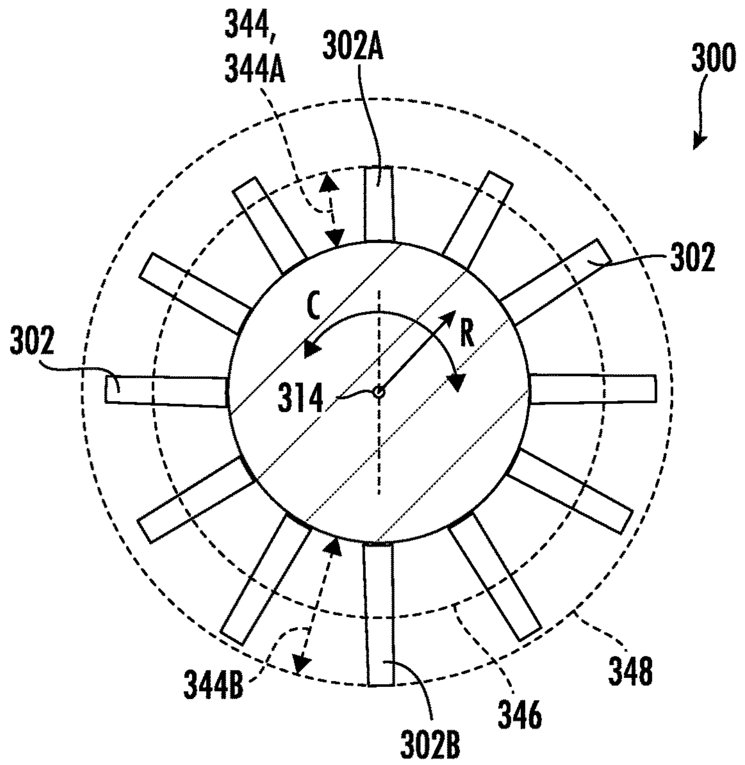
FIG. 15 is a schematic, forward-looking-aft view of a plurality of outlet guide vanes coupled to a cowl of a turbomachine of the exemplary turbofan engine of FIG. 14.
Figure 16:
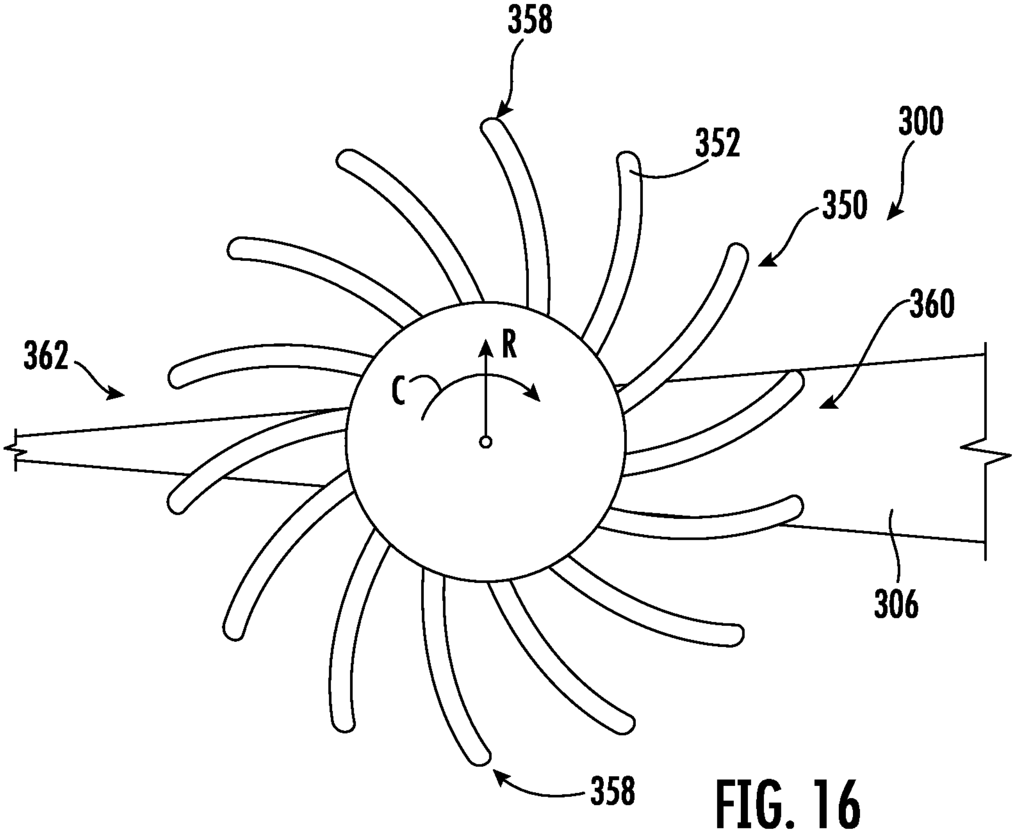
FIG. 16 is a schematic, forward-looking-aft view of a rotor assembly of a turbofan engine in accordance with yet another exemplary aspect of the present disclosure.
Figure 17:
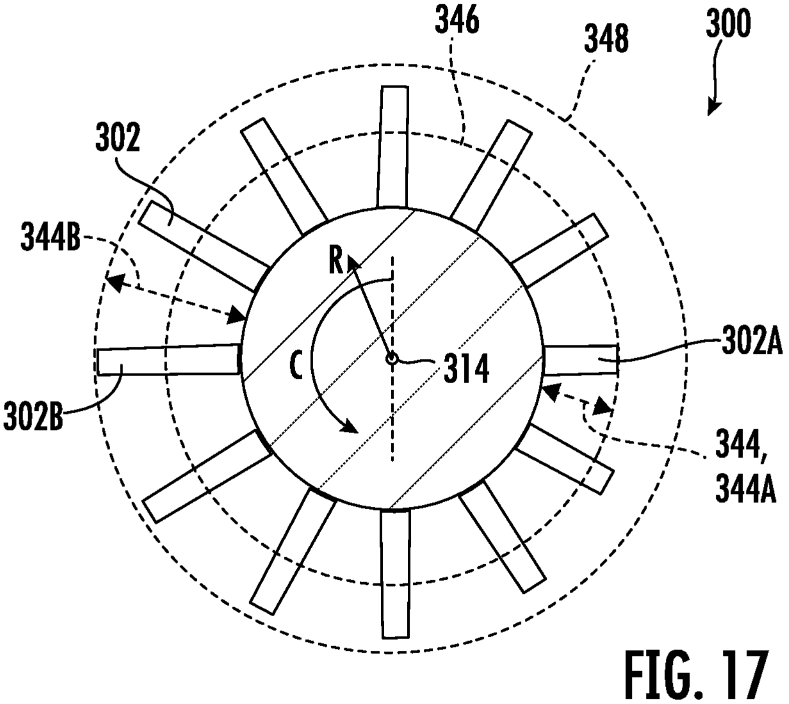
FIG. 17 is a schematic, forward-looking-aft view of a plurality of outlet guide vanes coupled to a cowl of a turbomachine of the exemplary turbofan engine of FIG. 16.

For example, referring now to FIGS. 14 and 15, as well as FIGS. 16 and 17, two additional turbofan engines 300 are depicted designed to address different aerodynamic flow fields of the turbofan engine 300. The exemplary turbofan engines 300 of FIGS. 14 and 15, as well as of FIGS. 16 and 17, may be configured in a similar manner as exemplary turbofan engines 100, 200, 300 described above.

Referring particular to FIGS. 14 and 15, the exemplary turbofan engine 300 is configured to be mounted through a pylon 308. Referring particular to FIG. 14, the pylon 308 extends to a turbomachine 310 (see FIG. 15) of the turbofan engine 300 at a 12 o'clock position. With such a configuration, the pylon 308 may create an aerodynamic blockage, creating a higher pressure upstream of the pylon 308 relative to other locations along a circumferential direction C. Such a blockage may create a higher level of loading on the rotor blades 352 as they pass by upstream in the circumferential vicinity of the pylon 308, shedding a stronger tip vortex upstream of the pylon 308. Accordingly, for the embodiment of FIGS. 14 and 15, a span 344 of the outlet guide vanes 302 at a circumferential position aligned with (e.g., within 30 degrees) of a leading edge of the pylon 308 may be reduced to avoid interaction with the higher strength vortex from the rotor assembly 350 at such location. In particular, for embodiment of FIGS. 14 and 15, a first outlet guide vane 302A having a first span 344A not greater than the spans 344 of the other outlet guide vanes 302 is positioned at the circumferential position aligned with the leading edge of the pylon 308 (see FIG. 14).

Similarly, referring now to FIGS. 16 and 17, the exemplary turbofan engine 300 is configured to be mounted to a wing 306, such that the wing 306 is positioned inwardly along a radial direction R of the turbofan engine 300 from radially outer tips 358 of the unducted rotor blades 352 of the unducted rotor assembly 350 (e.g., the wing 306 may be located vertically proximate the axis of the turbofan engine 300). In such a manner, the wing 306 may similarly create a blockage that creates a higher pressure upstream of the wing 306, potentially leading to higher vortex strengths coming from the rotor blades 352 at such a circumferential position(s). Notably, for the embodiment shown, a thickness of the wing 306 decreases along its length, such that on a first side 360 of the turbofan engine 300, a thickness of the wing 306 is greater than a thickness of the wing 306 on a second side 362 of the turbofan engine 300. Further for a swept wing, a distance along an axial direction of the turbofan engine 300 between a first side 360 of the wing 306 and the turbofan engine 300 is shorter than at the second side 362, compounding or amplifying the effect of different wing thicknesses on the fan loading distortion.

With such a configuration, the span 344 of the outlet guide vanes 302 at the circumferential position aligned (e.g., within 30 degrees) with a leading edge of the wing 306 may be reduced to avoid interaction with the higher strength vortex from the rotor assembly 350 at such location. In particular, for the embodiment depicted, the plurality of outlet guide vanes 302 includes a first outlet guide vane 302A having a first span 344A not greater than the spans 344 of the other outlet guide vanes 302 positioned at a circumferential position aligned with the leading edge of a thicker portion of the wing 306, or rather positioned at a circumferential position aligned with the leading edge of a the wing 306 on the first side 360 of the turbofan engine 300 (see FIG. 17).

Referring to FIGS. 14 through 17, it will be appreciated that the position of the first outlet guide vane 302A with the first span 344A not greater than the spans 344 of the other outlet guide vanes 302 (i.e., the shortest outlet guide vane 302) and the second outlet guide vane 302B with the second span 344B not shorter than the spans 344 of the other outlet guide vanes 302 (e.g., a longest outlet guide vane 302) may be based on a location of the most overloaded fan blade, similar to the discussion above with reference to the determination of the position of the gap spacing. In such a manner, although the first outlet guide vanes 302A with the first spans 344A not greater than the spans 344 of the other outlet guide vanes 302 in FIGS. 15 and 17 are depicted immediately downstream of the pylon 308 and the wing 306, in other embodiments the first outlet guide vanes 302A may be offset in the circumferential direction C by up to $\theta_{SWIRL\_OFF}$.

It will be appreciated that in still other exemplary embodiments, a location of a first outlet guide vane 302A with a first span 344A not greater than the spans 344 of the other outlet guide vanes 302 (i.e., a shortest outlet guide vane 302) and a second outlet guide vane 302B with a second span 344B not shorter than the spans 344 of the other outlet guide vanes 302 (e.g., a longest outlet guide vane 302) may be determined in any other suitable manner. For example, referring now to FIG. 18, a schematic, forward-looking-aft view of a plurality of outlet guide vanes 302 coupled to a cowl 304 of a turbomachine 310 of a turbofan engine 300 in accordance with another exemplary embodiment of the present disclosure is provided.

Figure 18:
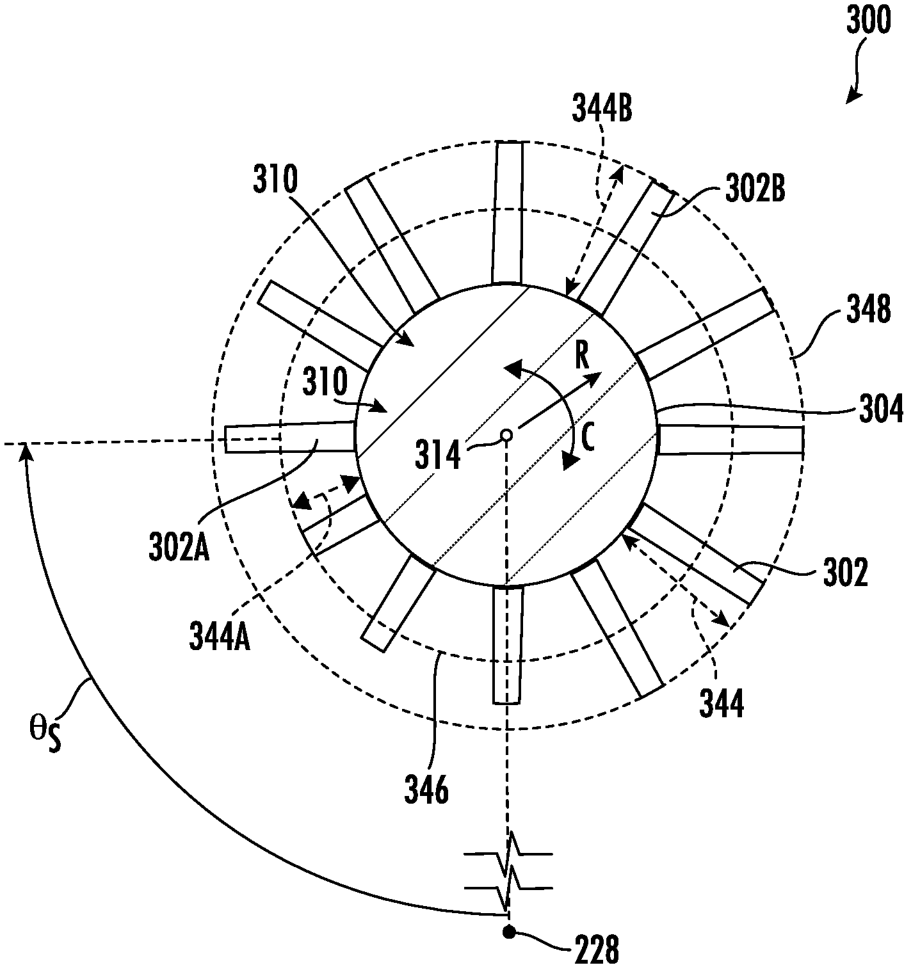
FIG. 18 is a schematic, forward-looking-aft view of a plurality of outlet guide vanes coupled to a cowl of a turbomachine of in accordance with another exemplary aspect of the present disclosure.

For the embodiment of FIG. 18, the turbofan engine 300 defines an acoustically sensitive location 228 along the circumferential direction C, corresponding to an external targeted noise reduction location. In the embodiment shown, the acoustically sensitive location 228 is positioned at a six o'clock position. The first outlet guide vane 302A is offset by an angle $\theta_S$. $\theta_S$ is, for the embodiment depicted, between 60 degrees and 120 degrees in the direction of rotation of the fan of the turbofan engine 300, or counter the direction of rotation of the fan of the turbofan engine 300. In such a manner, the exemplary turbofan engine 300 depicted is configured to reduce an amount of noise propagation from the outlet guide vanes 302 downwardly during operation of the turbofan engine 200, reducing an amount of noise experienced during, e.g., a flyover event of an aircraft including the turbofan engine 300 of FIG. 18.

It will be appreciated, however, that in other exemplary embodiments, the turbofan engine 300 may define one or more acoustically sensitive locations 228 at other positions, such as at one or more of the positions discussed above with reference to FIGS. 2 through 6.

Referring to FIGS. 10 through 18, generally, it will be appreciated that the plurality of outlet guide vanes 302 in the various embodiments depicted each generally includes a first outlet guide vane 302A with a first span 344A not greater than the spans 344 of the other outlet guide vanes 302 (i.e., a shortest outlet guide vane 302) and a second outlet guide vane 302B with a second span 344B not shorter than the spans 344 of the other outlet guide vanes 302 (e.g., a longest outlet guide vane 302). The plurality of outlet guide vanes 302 further includes a plurality of intermediate outlet guide vanes 302 positioned between the first outlet guide vane 302A and the second outlet guide vane 302B. The spans 344 of the plurality of intermediate outlet guide vanes 302 are greater than the first span 344A and less than the second span 344B.

Figure 19:
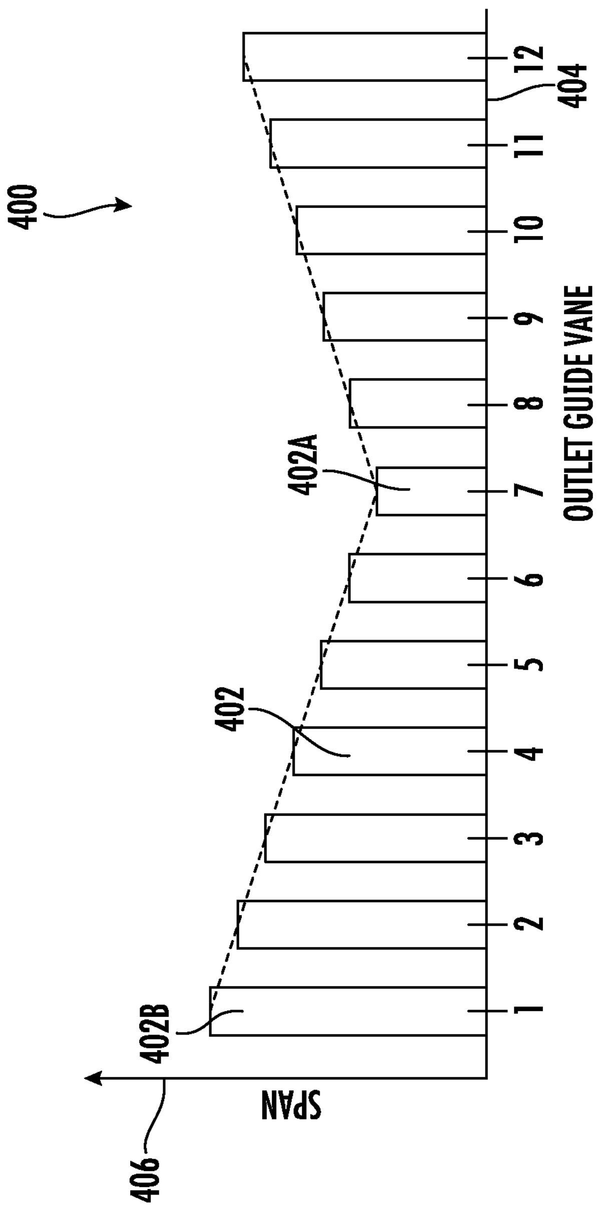
FIG. 19 is a graph depicting spans of a plurality of outlet guide vanes in accordance with an exemplary aspect of the present disclosure.

In particular, referring now to FIG. 19, a graph 400 is provided showing a plurality of outlet guide vanes 402 arranged along an X axis 404 and a span of each of the respective outlet guide vanes 402 along a Y axis 406. The plurality of outlet guide vanes 402 includes a first outlet guide vane 402A, a second outlet guide vane 402B, and a plurality of intermediate outlet guide vanes 402 positioned therebetween as noted above. In the embodiment shown, the first outlet guide vane 402A, the second outlet guide vane 402B, and the plurality of intermediate outlet guide vanes 402 includes at least half of a total number of outlet guide vanes 402 of the plurality of outlet guide vanes 402.

In the embodiment shown the spans of the outlet guide vanes 402 increases from the first outlet guide vane 402A to the second outlet guide vane 402B according to a function. The function may be one of a linear function or a cosine function, or any other suitable function. In particular, for the embodiment of FIG. 19, the function is a linear function such that the spans of the outlet guide vanes 402 increase linearly from the first outlet guide vane 402A to the second outlet guide vane 402B. The linear function is depicted in phantom in the graph 400 of FIG. 19

Figure 20:
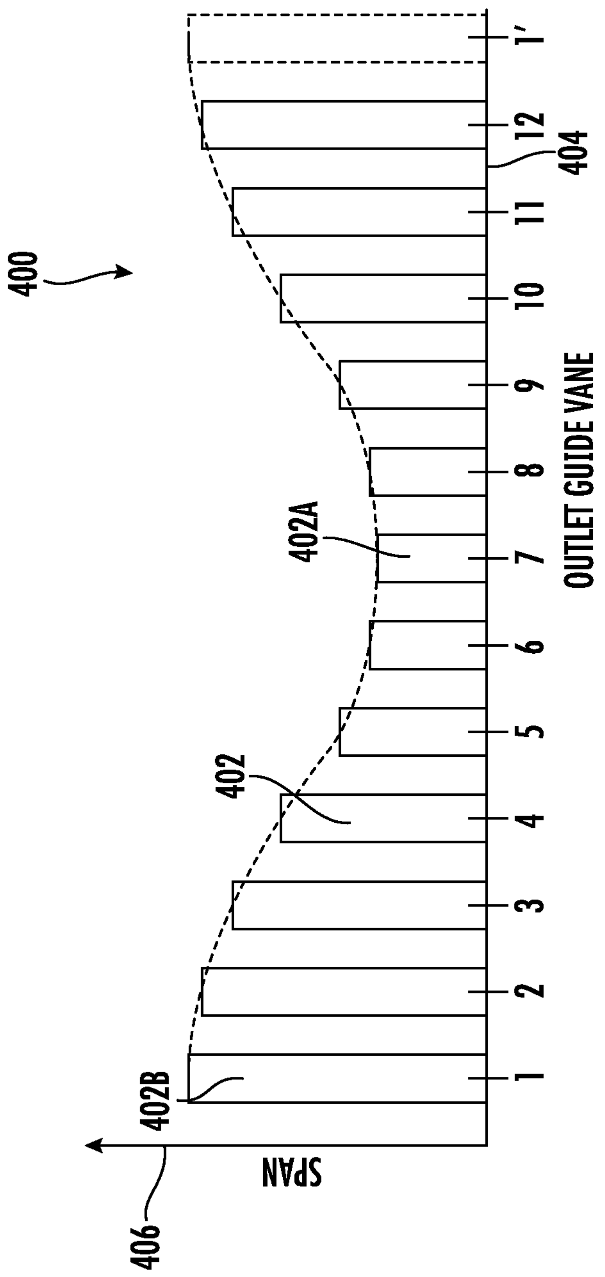
FIG. 20 is a graph depicting spans of a plurality of outlet guide vanes in accordance with another exemplary aspect of the present disclosure.

However, in other embodiments, the spans may increase according to any other suitable function. For example, referring now briefly to FIG. 20, the spans of the outlet guide vanes 402 depicted increases from the first outlet guide vane 402A to the second outlet guide vane 402B according to a sinusoidally-varied function (or rather negative cosine function for the embodiment depicted in FIG. 19). The sinusoidally-varied function is depicted in phantom in the graph 400 of FIG. 20.

In such a manner, the plurality of outlet guide vanes 402 may be configured to most efficiently reduce a noise generated through interaction of airflow from the rotor blades with the outlet guide vanes 402, while still providing for efficient operation of the turbofan engine.

It will be appreciated that at least certain of the exemplary configurations described above relate to determining a position of a first outlet guide vane 302A with a first span 344A that is not greater than the spans 344 of the other outlet guide vanes 302 of the plurality of outlet guide vanes 302, i.e., the shortest outlet guide vane 302. In other exemplary aspects, the same or similar methodologies described above may be utilized to determine a position of a plurality of consecutive outlet guide vanes 302 forming a "short vane subset", where an average span 344 of the outlet guide vanes 302 forming the short vane subset is less than a median span 344 of all of the plurality of outlet guide vanes 302.

In at least one exemplary embodiment, the plurality of consecutive outlet guide vanes 302 forming the short vane subset may be at least two outlet guide vanes 302 and less than 50% of the plurality of outlet guide vanes 302, such as less than 25% of the plurality of outlet guide vanes 302.

In particular, in one exemplary aspect the unducted rotor assembly defines a circumferential position, $\theta_0$, of the highest loaded rotor blade at a first turbofan engine operating condition and a tip radius, $R_{TIP}$, wherein the turbofan engine 100 defines an axial spacing, S, between the plurality of unducted rotor blades and the plurality of outlet guide vanes 302 and an advance ratio, J. With such a configuration, the turbofan engine 100 may define a circumferential swirl offset, $\theta_{SWIRL\_OFF}$, equal to $$2\times\tan^{-1}\left(\frac{\pi\times S}{J\times R_{TIP}}\right);$$

With such a configuration, the plurality of consecutive outlet guide vanes 302 forming the short vane subset may include at least one outlet guide vane 302 located at a circumferential position between $\theta_0$ and $\theta_{SWIRL\_OFF}$ (see FIG. 11).

In another exemplary aspect, the unducted rotor assembly may define a circumferential position, $\theta_1$, of highest inward deflection of a streamtube 356 at a turbofan engine operating condition (see FIGS. 12 and 13). With such a configuration, the plurality of consecutive outlet guide vanes 302 forming the short vane subset includes at least one outlet guide vane may be located within 30 degrees of $\theta_1$.

Further, in still other exemplary aspects, the turbofan engine 100 may define an acoustically sensitive location, $\theta_A$, along the circumferential direction. With such an exemplary aspect, the plurality of consecutive outlet guide vanes 302 forming the short vane subset includes at least one outlet guide vane 302 located at a circumferential position of $\theta_A$ plus $\theta_S$ or $\theta_A$ minus $\theta_S$, where $\theta_S$ is between 60 degrees and 120 degrees (see FIG. 18).

Further aspects are provided by the subject matter of the following clauses:

A turbofan engine defining a circumferential direction, the turbofan engine comprising: a turbomachine; an unducted rotor assembly drivingly coupled to the turbomachine, the unducted rotor assembly including a plurality of unducted rotor blades; and a plurality of outlet guide vanes positioned downstream of the plurality of unducted rotor blades, the plurality of outlet guide vanes each defining a span, wherein the spans of the plurality of outlet guide vanes are nonuniform.

The turbofan engine of any preceding clause, wherein the unducted rotor assembly defines a circumferential position, $\theta_0$, of the highest loaded rotor blade at a first turbofan engine operating condition, wherein a rotor blade of the unducted rotor assembly further defines a tip radius, $R_{TIP}$, wherein the turbofan engine defines an axial spacing, S, between the plurality of unducted rotor blades and the plurality of outlet guide vanes and an advance ratio, J, and wherein the turbofan engine defines a circumferential swirl offset, $\theta_{SWIRL\_OFF}$, equal to $$2\times\tan^{-1}\left(\frac{\pi\times S}{J\times R_{TIP}}\right);$$

and wherein the plurality of outlet guide vanes includes a first outlet guide vane with a first span not greater than the spans of the other outlet guide vanes, the first outlet guide vane located at a circumferential position between $\theta_0$ and $\theta_{SWIRL\_OFF}$.

The turbofan engine of any preceding clause, wherein $\theta_{SWIRL\_OFF}$ is defined in a direction of rotation of the unducted rotor assembly.

The turbofan engine of any preceding clause, wherein the plurality of outlet guide vanes includes a second outlet guide vane with a second span not shorter than the spans of the other outlet guide vanes, wherein the second outlet guide vane is located at a circumferential position between 150 degrees and 210 degrees offset from the first outlet guide vane.

The turbofan engine of any preceding clause, wherein the turbofan engine is configured to be mounted to an aircraft through a pylon at a pylon attachment location, wherein the circumferential position, $\theta_0$, of the highest loaded rotor blade is aligned circumferentially with the pylon attachment location, wherein the plurality of outlet guide vanes includes a first outlet guide vane with a first span not greater than the spans of the other outlet guide vanes, the first outlet guide vane aligned with the pylon attachment location or positioned within $\theta_{SWIRL\_OFF}$ of the pylon attachment location in a direction of rotor rotation.

The turbofan engine of any preceding clause, wherein the turbofan engine is configured to be mounted to a wing of an aircraft at a location where at least a portion the wing is positioned inward along a radial direction from tips of the unducted rotor blades, wherein the plurality of outlet guide vanes includes a first outlet guide vane with a first span not greater than the spans of the other outlet guide vanes, the first outlet guide vane aligned with the wing or positioned within $\theta_{SWIRL\_OFF}$ of the wing in a direction of rotor rotation.

The turbofan engine of any preceding clause, wherein the unducted rotor assembly defines a circumferential position, $\theta_1$, of highest inward deflection of a streamtube at a turbofan engine operating condition, wherein the plurality of outlet guide vanes includes a first outlet guide vane with a first span not greater than the spans of the other outlet guide vanes, the first outlet guide vane located within 30 degrees of $\theta_1$.

The turbofan engine of any preceding clause, wherein the turbofan engine operating condition is a high angle of attack operating condition, and wherein $\theta_1$ corresponds to a bottom dead center location.

The turbofan engine of any preceding clause, wherein the plurality of outlet guide vanes includes a first outlet guide vane with a first span not greater than the spans of the other outlet guide vanes, a second outlet guide vane with a second span not shorter than the spans of the other outlet guide vanes, and a plurality of intermediate outlet guide vanes positioned between the first and second outlet guide vanes, wherein the spans of the intermediate outlet guide vanes are each greater than the first span and less than the second span.

The turbofan engine of any preceding clause, wherein the spans of the plurality of intermediate outlet guide vanes increases from the first span to the second span according to a function, and wherein the function is one of a sinusoidally-varying function or a linear function.

The turbofan engine of any preceding clause, wherein the plurality of outlet guide vanes includes $N_{OGV}$ number of outlet guide vanes, the plurality of outlet guide vanes including a pair of outlet guide vanes defining a gap spacing greater than 360 degrees divided by $N_{OGV}$.

The turbofan engine of any preceding clause, wherein the turbomachine defines a pylon attachment location along the circumferential direction, and wherein the pylon attachment location positioned outside of between the pair of outlet guide vanes.

The turbofan engine of any preceding clause, wherein the plurality of unducted rotor blades includes $N_B$ number of unducted rotor blades, wherein $N_B$ is greater than $N_{OGV}$.

The turbofan engine of any preceding clause, wherein the plurality of outlet guide vanes includes a first cluster of outlet guide vanes defining a first cluster spacing less than $360/N_{OGV}$ and greater than or equal to $360/(N_B+2)$.

The turbofan engine of any preceding clause, wherein the plurality of outlet guide vanes includes at least one fixed-pitch outlet guide vane.

The turbofan engine of any preceding clause, wherein the turbofan engine defines an acoustically sensitive location along the circumferential direction, $\theta_A$, wherein the plurality of outlet guide vanes includes a first outlet guide vane with a first span not greater than the spans of the other outlet guide vanes, the first outlet guide vane located at a circumferential position of $\theta_A$ plus $\theta_S$ or $\theta_A$ minus $\theta_S$, where $\theta_S$ is between 60 degrees and 120 degrees.

The turbofan engine of any preceding clause, wherein the plurality of outlet guide vanes comprises a plurality of consecutive outlet guide vanes forming a short vane subset, wherein an average span of the outlet guide vanes forming the short vane subset is less than a median span of all of the plurality of outlet guide vanes.

An outlet guide vane assembly for a turbofan engine, the turbofan engine defining a circumferential direction and including a turbomachine and an unducted rotor assembly drivingly coupled to the turbomachine, the outlet guide vane assembly comprising: a plurality of outlet guide vanes configured to be positioned downstream of a plurality of unducted rotor blades of the unducted rotor assembly when installed in the turbofan engine, the plurality of outlet guide vanes each defining a span, the spans of the plurality of outlet guide vanes being nonuniform along the circumferential direction.

The outlet guide vane assembly of any preceding clause, wherein the unducted rotor assembly defines a circumferential position, $\theta_0$, of the highest loaded rotor blade at a first turbofan engine operating condition and a tip radius, $R_{TIP}$, wherein the turbofan engine defines an axial spacing, S, between the plurality of unducted rotor blades and the plurality of outlet guide vanes and an advance ratio, J, and wherein the turbofan engine defines a circumferential swirl offset, $\theta_{SWIRL\_OFF}$, equal to $$2\times\tan^{-1}\left(\frac{\pi\times S}{J\times R_{TIP}}\right);$$

and wherein the plurality of outlet guide vanes includes a first outlet guide vane with a first span not greater than the spans of the other outlet guide vanes, the first outlet guide vane located at a circumferential position between $\theta_0$ and $\theta_{SWIRL\_OFF}$, wherein $\theta_{SWIRL\_OFF}$ is defined in a direction of rotation of the unducted rotor assembly.

The outlet guide vane assembly of any preceding clause, wherein the unducted rotor assembly defines a circumferential position, $\theta_1$, of highest inward deflection of a streamtube at a turbofan engine operating condition, wherein the plurality of outlet guide vanes includes a first outlet guide vane with a first span not greater than the spans of the other outlet guide vanes, the first outlet guide vane located within 30 degrees of $\theta_1$.

A turbofan engine defining a circumferential direction, the turbofan engine comprising: a turbomachine, the turbomachine defining a pylon attachment location along the circumferential direction; an unducted rotor assembly drivingly coupled to the turbomachine, the unducted rotor assembly including a plurality of unducted rotor blades; and an $N_{OGV}$ plurality of outlet guide vanes positioned downstream of the plurality of unducted rotor blades including a first outlet guide vane and a second outlet guide vane adjacent the first outlet guide vane, a circumferential gap extending from the first outlet guide vane to the second outlet guide vane wherein the circumferential gap is greater than 360 degrees divided by $N_{OGV}$, and the pylon attachment location is located outside of the circumferential gap.

The turbofan engine of any preceding clause, wherein the turbofan engine defines an acoustically sensitive location along the circumferential direction, wherein the acoustically sensitive location is positioned between the first and second outlet guide vanes, and wherein the acoustically sensitive location is positioned between a three o'clock position and a nine o'clock position.

The turbofan engine of any preceding clause, wherein the turbofan engine defines an acoustically sensitive location along the circumferential direction, wherein the acoustically sensitive location is positioned between the first and second outlet guide vanes, and wherein the acoustically sensitive location is positioned between a five o'clock position and a seven o'clock position.

The turbofan engine of any preceding clause, wherein the turbofan engine defines an acoustically sensitive location along the circumferential direction, wherein the acoustically sensitive location is positioned between the first and second outlet guide vanes, and wherein the acoustically sensitive location is positioned between a three o'clock position and a five o'clock position or between a seven o'clock position and a nine o'clock position.

The turbofan engine of any preceding clause, wherein the plurality of unducted rotor blades includes $N_B$ number of unducted rotor blades, wherein $N_B$ is greater than $N_{OGV}$.

The turbofan engine of any preceding clause, wherein the plurality of outlet guide vanes includes a first cluster of outlet guide vanes defining a first cluster spacing less than $360/N_{OGV}$ and greater than or equal to $360/(N_B+2)$.

The turbofan engine of any preceding clause, wherein the first cluster includes the first outlet guide vane.

The turbofan engine of any preceding clause, wherein the plurality of outlet guide vanes includes a second cluster of outlet guide vanes defining a second cluster spacing less than $360/N_{OGV}$ and greater than or equal to $360/(N_B+2)$, and wherein the second cluster includes the second outlet guide vane.

The turbofan engine of any preceding clause, wherein the gap spacing is at least 25% greater than the first cluster spacing and up to 200% of the first cluster spacing.

The turbofan engine of any preceding clause, wherein the plurality of outlet guide vanes includes a third outlet guide vane and a fourth outlet guide vane positioned opposite the first and second outlet guide vanes, and wherein a spacing between the third and fourth outlet guide vanes is equal to the gap spacing.

The turbofan engine of any preceding clause, wherein the pylon attachment location is positioned at a 12 o'clock position.

The turbofan engine of any preceding clause, wherein the plurality of outlet guide vanes are unshrouded outlet guide vanes.

A turbofan engine defining an axial direction, the turbofan engine comprising: a turbomachine, the turbomachine defining a pylon attachment location along the axial direction; an unducted rotor assembly drivingly coupled to the turbomachine, the unducted rotor assembly including a plurality of unducted rotor blades, the plurality of unducted rotor blades including $N_B$ number of unducted rotor blades; and a plurality of outlet guide vanes positioned downstream of the plurality of unducted rotor blades, the plurality of outlet guide vanes including $N_{OGV}$ number of outlet guide vanes which is less than $N_B$, the plurality of outlet guide vanes including a first pair of outlet guide vanes defining a spacing less than $360/N_{OGV}$ and greater than or equal to $360/(N_B+2)$, wherein the pylon attachment location is aft of the plurality of outlet guide vanes.

The turbofan engine of any preceding clause, wherein the spacing is greater than or equal to $360/(N_B+1)$.

The turbofan engine of any preceding clause, wherein the spacing is greater than or equal to $360/N_B$.

An aircraft comprising: a fuselage; a first wing extending from a first side of the fuselage and a second wing extending from a second side of the fuselage; and a propulsion system comprising: a first turbofan engine mounted to the first wing or the fuselage on the first side of the fuselage, the first turbofan engine defining a first circumferential direction and comprising a first unducted rotor assembly and a first plurality of outlet guide vanes positioned downstream of the first unducted rotor assembly, a first gap spacing defined by the first plurality of outlet guide vanes and extending along the first circumferential direction, wherein the first gap spacing location is between a 2 o'clock position and a 7 o'clock position, the first gap spacing being greater than an average gap spacing of the first plurality of outlet guide vanes; and a second turbofan engine mounted to the second wing or the fuselage on the second side of the fuselage, the second turbofan engine defining a second circumferential direction and comprising a second unducted rotor assembly and a second plurality of outlet guide vanes positioned downstream of the second unducted rotor assembly, a second gap spacing defined by the second plurality of outlet guide vanes and extending along the first circumferential direction, wherein the second gap spacing location is between a five o'clock position and a 10 o'clock position, the second gap spacing being greater than an average gap spacing of the second plurality of outlet guide vanes.

The aircraft of any preceding clause, wherein the first gap location is between a three o'clock position and a six o'clock position, and wherein the second gap location is between a six o'clock position and a nine o'clock position.

The aircraft of any preceding clause, wherein the first side of the fuselage is a port side of the fuselage, and wherein the second side of the fuselage is a starboard side of the fuselage.

The aircraft of any preceding clause, wherein the first turbofan engine defines a first acoustically sensitive location along the first circumferential direction positioned at the first gap location, and wherein the second turbofan engine defines a second acoustically sensitive location along the first circumferential direction positioned at the second gap location.

The aircraft of any preceding clause, wherein the first plurality of outlet guide vanes includes $N_{OGV1}$ number of outlet guide vanes, wherein the first plurality of outlet guide vanes further includes a first outlet guide vane and a second outlet guide vane adjacent the first outlet guide vane defining the first gap spacing therebetween, wherein the second plurality of outlet guide vanes includes $N_{OGV2}$ number of outlet guide vanes, wherein the second plurality of outlet guide vanes further includes a first outlet guide vane and a second outlet guide vane adjacent the first outlet guide vane defining the second gap spacing therebetween.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A turbofan engine defining a circumferential direction, the turbofan engine comprising:

a turbomachine, the turbomachine defining a pylon attachment location along the circumferential direction;

an unducted rotor assembly drivingly coupled to the turbomachine, the unducted rotor assembly including a plurality of unducted rotor blades;

an $N_{OGV}$ plurality of outlet guide vanes positioned downstream of the plurality of unducted rotor blades including a first outlet guide vane and a second outlet guide vane adjacent the first outlet guide vane;

wherein the plurality of unducted rotor blades includes $N_B$ number of unducted rotor blades, wherein $N_B$ is greater than $N_{OGV}$;

wherein the plurality of outlet guide vanes includes a cluster of outlet guide vanes defining a cluster spacing less than $360/N_{OGV}$ and greater than or equal to $360/(N_B+2)$; and a circumferential gap extending from the first outlet guide vane to the second outlet guide vane wherein the circumferential gap is greater than 360 degrees divided by $N_{OGV}$, and the pylon attachment location is located outside of the circumferential gap.

2. The turbofan engine of claim 1, wherein the turbofan engine defines an acoustically sensitive location along the circumferential direction, wherein the acoustically sensitive location is positioned between the first and second outlet guide vanes, and wherein the acoustically sensitive location is positioned between a three o'clock position and a nine o'clock position.

3. The turbofan engine of claim 1, wherein the turbofan engine defines an acoustically sensitive location along the circumferential direction, wherein the acoustically sensitive location is positioned between the first and second outlet guide vanes, and wherein the acoustically sensitive location is positioned between a five o'clock position and a seven o'clock position.

4. The turbofan engine of claim 1, wherein the turbofan engine defines an acoustically sensitive location along the circumferential direction, wherein the acoustically sensitive location is positioned between the first and second outlet guide vanes, and wherein the acoustically sensitive location is positioned between a three o'clock position and a five o'clock position or between a seven o'clock position and a nine o'clock position.

5. The turbofan engine of claim 1, wherein the cluster includes the first outlet guide vane.

6. The turbofan engine of claim 5, wherein the cluster is a first cluster, wherein the plurality of outlet guide vanes includes a second cluster of outlet guide vanes defining a second cluster spacing less than $360/N_{OGV}$ and greater than or equal to $360/(N_B+2)$, and wherein the second cluster includes the second outlet guide vane.

7. The turbofan engine of claim 1, wherein the gap spacing is at least 25% greater than the cluster spacing and up to 200% of the cluster spacing.

8. The turbofan engine of claim 1, wherein the pylon attachment location is positioned at a 12 o'clock position.

9. The turbofan engine of claim 1, wherein the plurality of outlet guide vanes are unshrouded outlet guide vanes.

10. A turbofan engine defining an axial direction, the turbofan engine comprising:

a turbomachine, the turbomachine defining a pylon attachment location along the axial direction;

an unducted rotor assembly drivingly coupled to the turbomachine, the unducted rotor assembly including a plurality of unducted rotor blades, the plurality of unducted rotor blades including $N_B$ number of unducted rotor blades; and a plurality of outlet guide vanes positioned downstream of the plurality of unducted rotor blades, the plurality of outlet guide vanes including $N_{OGV}$ number of outlet guide vanes which is less than $N_B$, the plurality of outlet guide vanes including a first pair of outlet guide vanes defining a spacing less than $360/N_{OGV}$ and greater than or equal to $360/(N_B+2)$, wherein the pylon attachment location is aft of the plurality of outlet guide vanes.

11. The turbofan engine of claim 10, wherein the spacing is greater than or equal to $360/(N_B+1)$.

12. The turbofan engine of claim 10, wherein the spacing is greater than or equal to $360/N_B$.

13. An aircraft comprising:

a fuselage;

a first wing extending from a first side of the fuselage and a second wing extending from a second side of the fuselage; and a propulsion system comprising:

a first turbofan engine mounted to the first wing or the fuselage on the first side of the fuselage, the first turbofan engine defining a first circumferential direction and comprising a first unducted rotor assembly and a first plurality of outlet guide vanes positioned downstream of the first unducted rotor assembly, the first unducted rotor assembly including a first plurality of unducted rotor blades, wherein the first plurality of unducted rotor blades includes $N_B$ number of unducted rotor blades, wherein $N_B$ is greater than $N_{OGV}$, wherein the first plurality of outlet guide vanes includes a first cluster of outlet guide vanes defining a first cluster spacing less than $360/N_{OGV}$ and greater than or equal to $360/(N_B+2)$:

a first gap spacing defined by the first plurality of outlet guide vanes and extending along the first circumferential direction, wherein the first gap spacing location is between a 2 o'clock position and a 7 o'clock position, the first gap spacing being greater than an average gap spacing of the first plurality of outlet guide vanes; and a second turbofan engine mounted to the second wing or the fuselage on the second side of the fuselage, the second turbofan engine defining a second circumferential direction and comprising a second unducted rotor assembly and a second plurality of outlet guide vanes positioned downstream of the second unducted rotor assembly, the second unducted rotor assembly including a second plurality of unducted rotor blades, wherein the second plurality of unducted rotor blades includes $N_B$ number of unducted rotor blades, wherein $N_B$ is greater than $N_{OGV}$, wherein the second plurality of outlet guide vanes includes a second cluster of outlet guide vanes defining a second cluster spacing less than $360/N_{OGV}$ and greater than or equal to $360/(N_B+2)$; and a second gap spacing defined by the second plurality of outlet guide vanes and extending along the first circumferential direction, wherein the second gap spacing location is between a five o'clock position and a 10 o'clock position, the second gap spacing being greater than an average gap spacing of the second plurality of outlet guide vanes.

14. The aircraft of claim 13, wherein the first gap location is between a three o'clock position and a six o'clock position, and wherein the second gap location is between a six o'clock position and a nine o'clock position.

15. The aircraft of claim 13, wherein the first side of the fuselage is a port side of the fuselage, and wherein the second side of the fuselage is a starboard side of the fuselage.

16. The aircraft of claim 13, wherein the first turbofan engine defines a first acoustically sensitive location along the first circumferential direction positioned at the first gap location, and wherein the second turbofan engine defines a second acoustically sensitive location along the first circumferential direction positioned at the second gap location.

17. The aircraft of claim 13, wherein the first plurality of outlet guide vanes includes $N_{OGV1}$ number of outlet guide vanes, wherein the first plurality of outlet guide vanes further includes a first outlet guide vane and a second outlet guide vane adjacent the first outlet guide vane defining the first gap spacing therebetween, wherein the second plurality of outlet guide vanes includes $N_{OGV2}$ number of outlet guide vanes, wherein the second plurality of outlet guide vanes further includes a first outlet guide vane and a second outlet guide vane adjacent the first outlet guide vane defining the second gap spacing therebetween.

18. A turbofan engine defining a circumferential direction, the turbofan engine comprising:

a turbomachine, the turbomachine defining a pylon attachment location along the circumferential direction;

an unducted rotor assembly drivingly coupled to the turbomachine, the unducted rotor assembly including a plurality of unducted rotor blades; and an $N_{OGV}$ plurality of outlet guide vanes positioned downstream of the plurality of unducted rotor blades including a first outlet guide vane and a second outlet guide vane adjacent the first outlet guide vane, wherein the $N_{OGV}$ plurality of outlet guide vanes includes a third outlet guide vane and a fourth outlet guide vane positioned opposite the first and second outlet guide vanes; and a circumferential gap extending from the first outlet guide vane to the second outlet guide vane wherein the circumferential gap is greater than 360 degrees divided by $N_{OGV}$, and the pylon attachment location is located outside of the circumferential gap, wherein a spacing between the third and fourth outlet guide vanes is equal to the circumferential gap spacing.

* * * * *